United States Patent
Du et al.

(10) Patent No.: US 10,295,683 B2
(45) Date of Patent: May 21, 2019

(54) AMPLITUDE INVERSION ON PARTITIONED DEPTH IMAGE GATHERS USING POINT SPREAD FUNCTIONS

(71) Applicant: SCHLUMBERGER TECHNOLOGY CORPORATION, Sugar Land, TX (US)

(72) Inventors: Xiang Du, Crawley (GB); Robin Fletcher, Guildford (GB)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 260 days.

(21) Appl. No.: 14/988,618

(22) Filed: Jan. 5, 2016

(65) Prior Publication Data

US 2017/0192118 A1 Jul. 6, 2017

(51) Int. Cl.
*G01V 1/28* (2006.01)

(52) U.S. Cl.
CPC ........ *G01V 1/282* (2013.01); *G01V 2210/512* (2013.01); *G01V 2210/614* (2013.01); *G01V 2210/6242* (2013.01)

(58) Field of Classification Search
None
See application file for complete search history.

(56) References Cited

U.S. PATENT DOCUMENTS

| | | | | |
|---|---|---|---|---|
| 4,839,869 A | * | 6/1989 | Corcoran | G01V 1/286 367/38 |
| 4,953,140 A | * | 8/1990 | Dablain | G01V 1/282 367/73 |
| 4,995,008 A | * | 2/1991 | Hornbostel | G01V 1/00 367/31 |
| 5,157,638 A | * | 10/1992 | Loumos | G01V 1/362 367/50 |
| 5,500,832 A | * | 3/1996 | Berryhill | G01V 1/301 367/50 |
| 5,764,514 A | * | 6/1998 | Raynaud | G01V 1/282 367/38 |

(Continued)

FOREIGN PATENT DOCUMENTS

WO 2015/073487 A1 5/2015

OTHER PUBLICATIONS

O'Briain, M., Smith D., Montoya C., Burgess B., Koza S., Zdraveva O., Ishak M., Alwon S., King R., Nikolenko D., Vautier S., 2013, Improved subsalt imaging and salt interpretation by RTM scenario testing and image partitioning: 83rd Annual International Meeting, SEG, Expanded Abstracts, 3856-3860.

(Continued)

*Primary Examiner* — Michael Lebentritt
(74) *Attorney, Agent, or Firm* — Michael Guthrie

(57) ABSTRACT

A method can include receiving input that specifies a type of partitionable pre-stack seismic data for a geologic environment and corresponding partitions; receiving an elastic model parameterized via elastic properties; generating synthetic seismic data for at least a portion of the geologic environment based at least in part on point spread functions and the elastic model; for the partitions, comparing the pre-stack seismic data and the generated synthetic seismic data; based at least in part on the comparing, updating the elastic model; and outputting values for at least one of the elastic properties.

19 Claims, 16 Drawing Sheets

(56) References Cited

U.S. PATENT DOCUMENTS

| | | | | |
|---|---|---|---|---|
| 5,838,564 | A * | 11/1998 | Bahorich | G01V 1/288 702/16 |
| 5,930,730 | A * | 7/1999 | Marfurt | G01V 1/288 702/16 |
| 6,092,026 | A * | 7/2000 | Bahorich | G01V 1/32 702/13 |
| 6,178,381 | B1 * | 1/2001 | Padhi | G01V 1/28 702/18 |
| RE38,229 | E * | 8/2003 | Marfurt | G01V 1/288 702/16 |
| 6,731,568 | B1 * | 5/2004 | Audebert | G01V 1/286 367/46 |
| 6,917,881 | B2 * | 7/2005 | Dubois | G01V 1/362 702/14 |
| 6,944,094 | B1 * | 9/2005 | Thomsen | G01V 1/48 367/25 |
| 2003/0110018 | A1 * | 6/2003 | Dutta | G01V 1/282 703/10 |
| 2006/0056272 | A1 * | 3/2006 | Hill | G01V 1/282 367/73 |
| 2007/0203673 | A1 * | 8/2007 | Sherrill | G01V 1/30 702/189 |
| 2012/0073825 | A1 | 3/2012 | Rough et al. | |
| 2012/0092962 | A1 | 4/2012 | Nichols et al. | |
| 2013/0185032 | A1 * | 7/2013 | Archer | G06F 17/5009 703/2 |
| 2014/0129147 | A1 * | 5/2014 | Zhang | E21B 49/088 702/8 |
| 2015/0030210 | A1 | 1/2015 | Matson | |
| 2015/0301223 | A1 * | 10/2015 | Xu | G01V 1/306 703/2 |
| 2016/0266267 | A1 * | 9/2016 | Guillaume | G01V 1/282 |
| 2016/0313468 | A1 * | 10/2016 | Du | G01V 11/00 |

OTHER PUBLICATIONS

Thomson C. J., Kitchenside P.W. and Fletcher R. P., 2015, Extended image gathers and reflectivity blurring, 85th Annual International Meeting, SEG, Expanded Abstracts, 5137~5140.

Vyas, M. Mobley E. and Nichols D., 2011, Source direction angle gathers: 73rd EAGE conference, Vienna, Austria, May 23-26, 2011, 5 pages.

Yoon, K. and Marfurt, K. J., 2006, Reverse-time migration using the Poynting vector: Exploration Geophysics, 2006, 37, 102-107.

International Search Report and Written Opinion for the equivalent International patent application PCT/US2016/013531 dated Oct. 4, 2016.

International Preliminary Report on Patentability for the equivalent International patent application PCT/US2016/013531 dated Jul. 19, 2018.

* cited by examiner

Trends 610

| Θ | Path Length | Frequency | Layer Thickness |
|---|---|---|---|
| 10° | 2*z*1.01 |  |  |
| 20° | 2*z*1.06 |  |  |
| 30° | 2*z*1.15 |  |  |
| 40° | 2*z*1.31 |  |  |
| 50° | 2*z*1.56 |  |  |
| 60° | 2*z*2.00 |  |  |

AMPLITUDE INVERSION ON PARTITIONED DEPTH IMAGE GATHERS USING POINT SPREAD FUNCTIONS

BACKGROUND

Seismic interpretation is a process that may examine seismic data (e.g., location and time or depth) in an effort to identify subsurface structures such as horizons and faults. Structures may be, for example, faulted stratigraphic formations indicative of hydrocarbon traps or flow channels. In the field of resource extraction, enhancements to seismic interpretation can allow for construction of a more accurate model, which, in turn, may improve seismic volume analysis for purposes of resource extraction. Various techniques described herein pertain to processing of seismic data, for example, for analysis of such data to characterize one or more regions in a geologic environment and, for example, to perform one or more operations (e.g., field operations, etc.).

SUMMARY

A method can include receiving input that specifies a type of partitionable pre-stack seismic data for a geologic environment and corresponding partitions; receiving an elastic model parameterized via elastic properties; generating synthetic seismic data for at least a portion of the geologic environment based at least in part on point spread functions and the elastic model; for the partitions, comparing the pre-stack seismic data and the generated synthetic seismic data; based at least in part on the comparing, updating the elastic model; and outputting values for at least one of the elastic properties. A system can include a processor; memory operatively coupled to the processor; and processor-executable instructions stored in the memory to instruct the system where the instructions include instructions to receive input that specifies a type of partitionable pre-stack seismic data for a geologic environment and corresponding partitions, receive an elastic model parameterized via elastic properties, generate synthetic seismic data for at least a portion of the geologic environment based at least in part on point spread functions and the elastic model, for the partitions, compare the pre-stack seismic data and the synthetic seismic data, based at least in part on a comparison of the pre-stack seismic data and the synthetic seismic data, update the elastic model, and output values for at least one of the elastic properties. One or more computer-readable storage media can include computer-executable instructions executable to instruct a computer to: receive input that specifies a type of partitionable pre-stack seismic data for a geologic environment and corresponding partitions; receive an elastic model parameterized via elastic properties; generate synthetic seismic data for at least a portion of the geologic environment based at least in part on point spread functions and the elastic model; for the partitions, compare the pre-stack seismic data and the synthetic seismic data; based at least in part on a comparison of the pre-stack seismic data and the synthetic seismic data, update the elastic model; and output values for at least one of the elastic properties. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

This description is not to be taken in a limiting sense, but rather is made merely for the purpose of describing the general principles of the implementations. The scope of the described implementations should be ascertained with reference to the issued claims.

Figure 1:
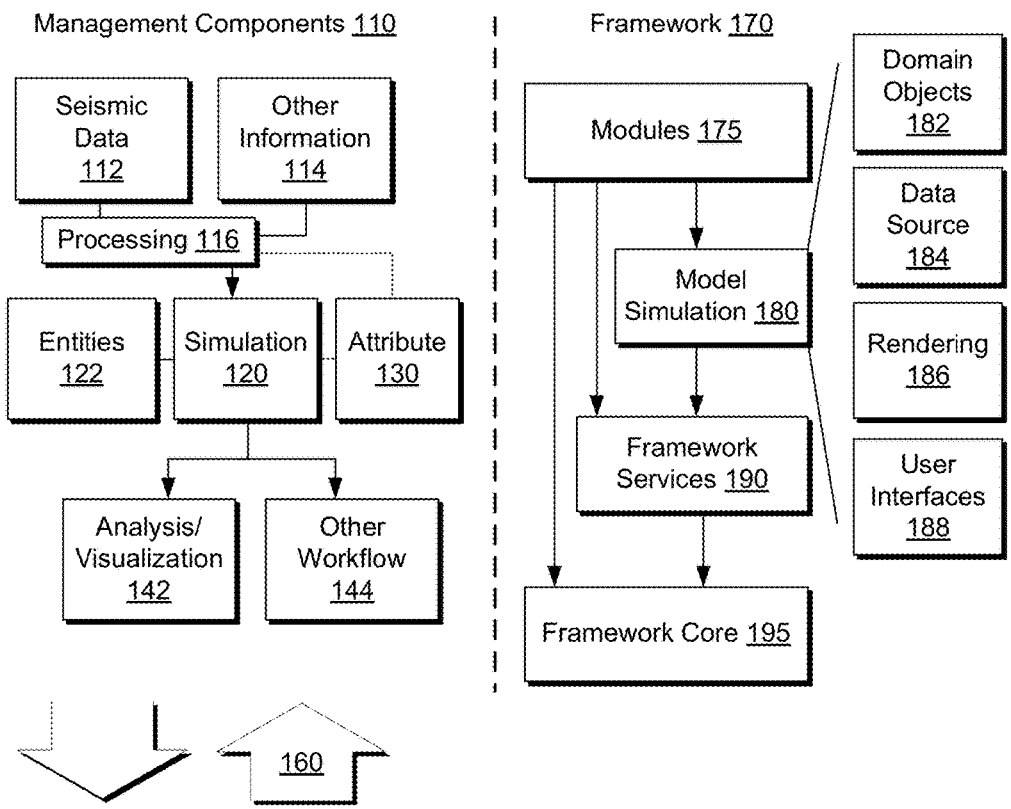
FIG. 1 illustrates an example system that includes various components for modeling a geologic environment and various equipment associated with the geologic environment.
Figure 1:
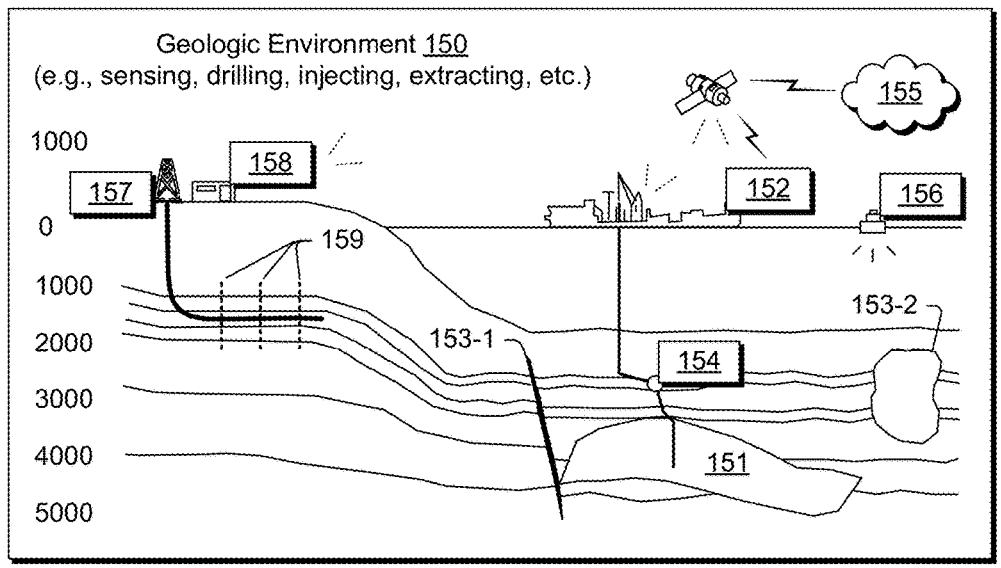

FIG. 1 shows an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, seismic data may be processed using a framework such as the OMEGA® framework (Schlumberger Limited, Houston, Tex.). The OMEGA® framework provides features that can be implemented for processing of seismic data, for example, through prestack seismic interpretation and seismic inversion. A framework may be scalable such that it enables processing and imaging on a single workstation, on a massive compute cluster, etc. As an example, one or more techniques, technologies, etc. described herein may optionally be implemented in conjunction with a framework such as, for example, the OMEGA® framework.

A framework for processing data may include features for 2D line and 3D seismic surveys. Modules for processing seismic data may include features for prestack seismic interpretation (PSI), optionally pluggable into a framework such as the OCEAN® framework. A workflow may be specified to include processing via one or more frameworks, plug-ins, add-ons, etc. A workflow may include quantitative interpretation, which may include performing pre- and post-stack seismic data conditioning, inversion (e.g., seismic to properties and properties to synthetic seismic), wedge modeling for thin-bed analysis, amplitude versus offset (AVO) and amplitude versus angle (AVA) analysis, reconnaissance, etc. As an example, a workflow may aim to output rock properties based at least in part on processing of seismic data. As an example, various types of data may be processed to provide one or more models (e.g., earth models). For example, consider processing of one or more of seismic data, well data, electromagnetic and magnetic telluric data, reservoir data, etc.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
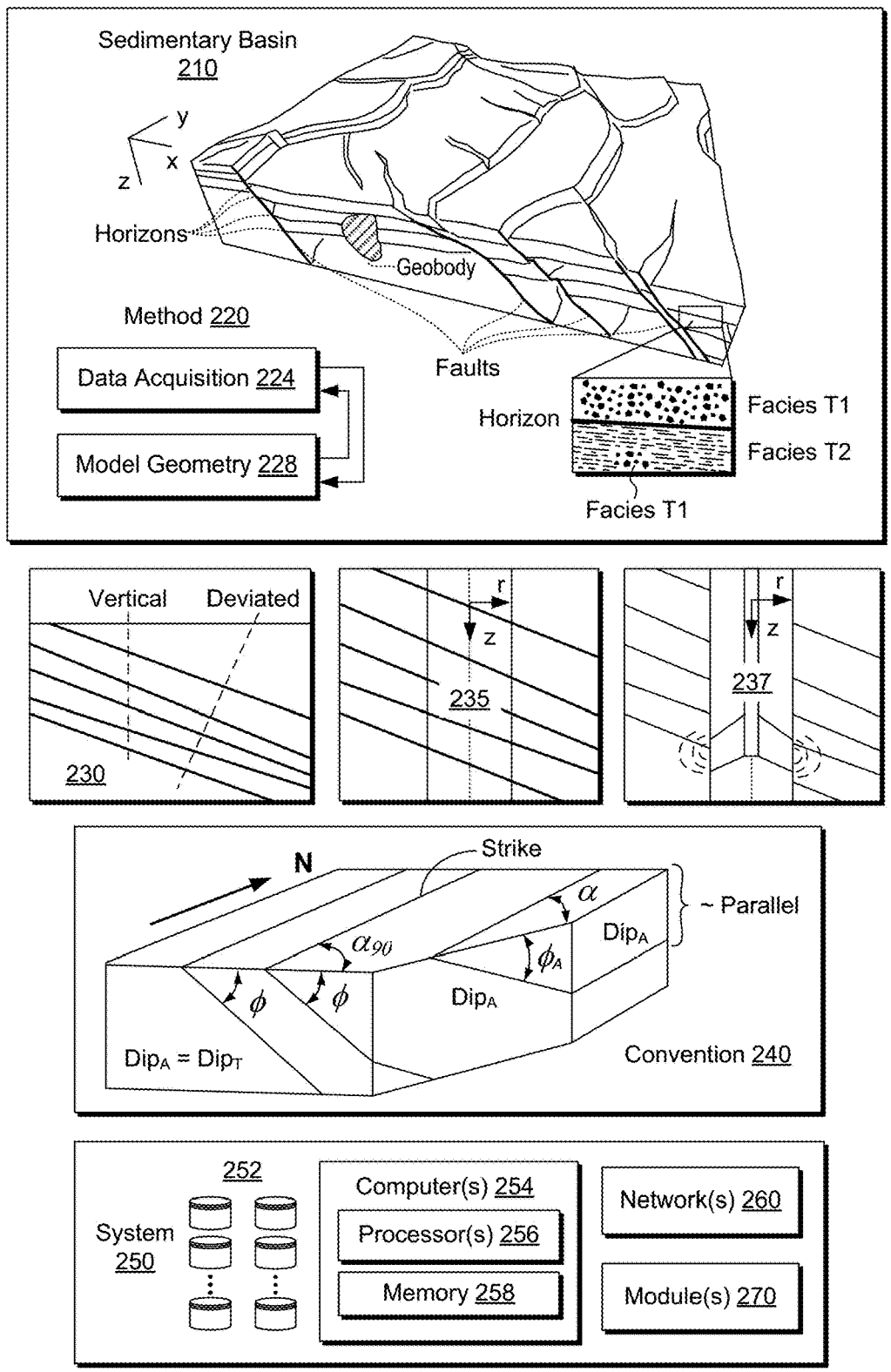
FIG. 2 illustrates an example of a sedimentary basin, an example of a method, an example of a formation, an example of a borehole, an example of a borehole tool, an example of a convention and an example of a system.

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, reservoir simulation, petroleum systems modeling, etc. may be applied to characterize various types of subsurface environments, including environments such as those of FIG. 1.

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

A commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, a borehole may be vertical, deviate and/or horizontal. As an example, a tool may be positioned to acquire information in a horizontal portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the TECHLOG® framework (Schlumberger Limited, Houston, Tex.).

As to the convention 240 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles φ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in any other direction except in the direction of true dip (see, e.g., $\phi_A$ as $Dip_A$ for angle α); however, it is possible that the apparent dip is equal to the true dip (see, e.g., φ as $Dip_A=Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with φ as $Dip_A=Dip_T$ for angle $\alpha_{90}$ with respect to the strike). As indicated, dip observed in a cross-section in any other direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and one or more modules 270. As to the one or more computers 254, each computer may include one or more processors (e.g., or processing cores) 256 and memory 258 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252.

As an example, the one or more modules 270 may include instructions (e.g., stored in memory) executable by one or more processors to instruct the system 250 to perform various actions. As an example, the system 250 may be configured such that the one or more modules 270 provide for establishing the framework 170 of FIG. 1 or a portion thereof. As an example, one or more methods, techniques, etc. may be performed using one or more modules, which may be, for example, one or more of the one or more modules 270 of FIG. 2.

As mentioned, seismic data may be acquired and analyzed to understand better subsurface structure of a geologic environment. Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than about 1 Hz and/or optionally more than about 100 Hz). Seismic data may be processed and interpreted, for example, to understand better composition, fluid content, extent and geometry of subsurface rocks.

Figure 3:
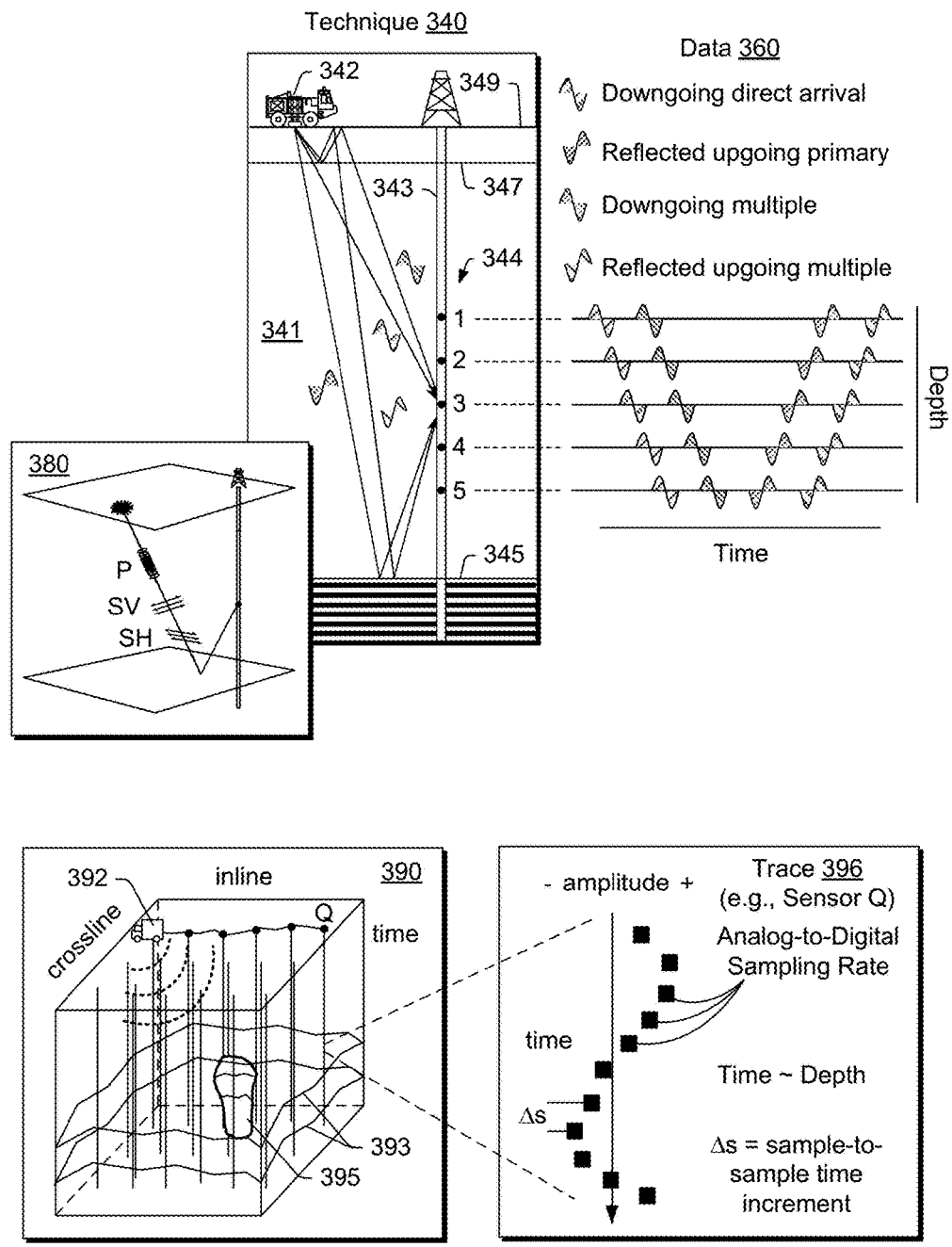
FIG. 3 illustrates an example of a technique that may acquire data.

FIG. 3 shows an example of an acquisition technique 340 to acquire seismic data (see, e.g., data 360). As an example, a system may process data acquired by the technique 340, for example, to allow for direct or indirect management of sensing, drilling, injecting, extracting, etc., with respect to a geologic environment. In turn, further information about the geologic environment may become available as feedback (e.g., optionally as input to the system). As an example, an operation may pertain to a reservoir that exists in a geologic environment such as, for example, a reservoir. As an example, a technique may provide information (e.g., as an output) that may specifies one or more location coordinates of a feature in a geologic environment, one or more characteristics of a feature in a geologic environment, etc.

In FIG. 3, the technique 340 may be implemented with respect to a geologic environment 341. As shown, an energy source (e.g., a transmitter) 342 may emit energy where the energy travels as waves that interact with the geologic environment 341. As an example, the geologic environment 341 may include a bore 343 where one or more sensors (e.g., receivers) 344 may be positioned in the bore 343. As an example, energy emitted by the energy source 342 may interact with a layer (e.g., a structure, an interface, etc.) 345 in the geologic environment 341 such that a portion of the energy is reflected, which may then be sensed by one or more of the sensors 344. Such energy may be reflected as an upgoing primary wave (e.g., or "primary" or "singly" reflected wave). As an example, a portion of emitted energy may be reflected by more than one structure in the geologic environment and referred to as a multiple reflected wave (e.g., or "multiple"). For example, the geologic environment 341 is shown as including a layer 347 that resides below a surface layer 349. Given such an environment and arrangement of the source 342 and the one or more sensors 344, energy may be sensed as being associated with particular types of waves.

As an example, a "multiple" may refer to multiply reflected seismic energy or, for example, an event in seismic data that has incurred more than one reflection in its travel path. As an example, depending on a time delay from a primary event with which a multiple may be associated, a multiple may be characterized as a short-path or a peg-leg, for example, which may imply that a multiple may interfere with a primary reflection, or long-path, for example, where a multiple may appear as a separate event. As an example, seismic data may include evidence of an interbed multiple from bed interfaces, evidence of a multiple from a water interface (e.g., an interface of a base of water and rock or sediment beneath it) or evidence of a multiple from an air-water interface, etc.

As shown in FIG. 3, the acquired data 360 can include data associated with downgoing direct arrival waves, reflected upgoing primary waves, downgoing multiple reflected waves and reflected upgoing multiple reflected waves. The acquired data 360 is also shown along a time axis and a depth axis. As indicated, in a manner dependent at least in part on characteristics of media in the geologic environment 341, waves travel at velocities over distances such that relationships may exist between time and space. Thus, time information, as associated with sensed energy, may allow for understanding spatial relations of layers, interfaces, structures, etc. in a geologic environment.

FIG. 3 also shows a diagram 380 that illustrates various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that can characterize anisotropy of media (e.g., seismic anisotropy), consider the Thomsen parameters ε, δ and γ. The Thomsen parameter δ can describe offset effects (e.g., short offset). As to the Thomsen parameter ε, it can describe offset effects (e.g., a long offset) and can relate to a difference between vertical and horizontal compressional waves (e.g., P or P-wave or quasi compressional wave qP or qP-wave). As to the Thomsen parameter γ, it can describe a shear wave effect. For example, consider an effect as to a horizontal shear wave with horizontal polarization to a vertical shear wave.

As an example, an inversion technique may be applied to generate a model that may include one or more parameters such as one or more of the Thomsen parameters. For example, one or more types of data may be received and used in solving an inverse problem that outputs a model (e.g., a reflectivity model, an impedance model, etc.).

In the example of FIG. 3, a diagram 390 shows acquisition equipment 392 emitting energy from a source (e.g., a transmitter) and receiving reflected energy via one or more sensors (e.g., receivers) strung along an inline direction. As the region includes layers 393 and, for example, the geobody 395, energy emitted by a transmitter of the acquisition equipment 392 can reflect off the layers 393 and the geobody 395. Evidence of such reflections may be found in the acquired traces. As to the portion of a trace 396, energy received may be discretized by an analog-to-digital converter that operates at a sampling rate. For example, the acquisition equipment 392 may convert energy signals sensed by sensor Q to digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

Figure 4:
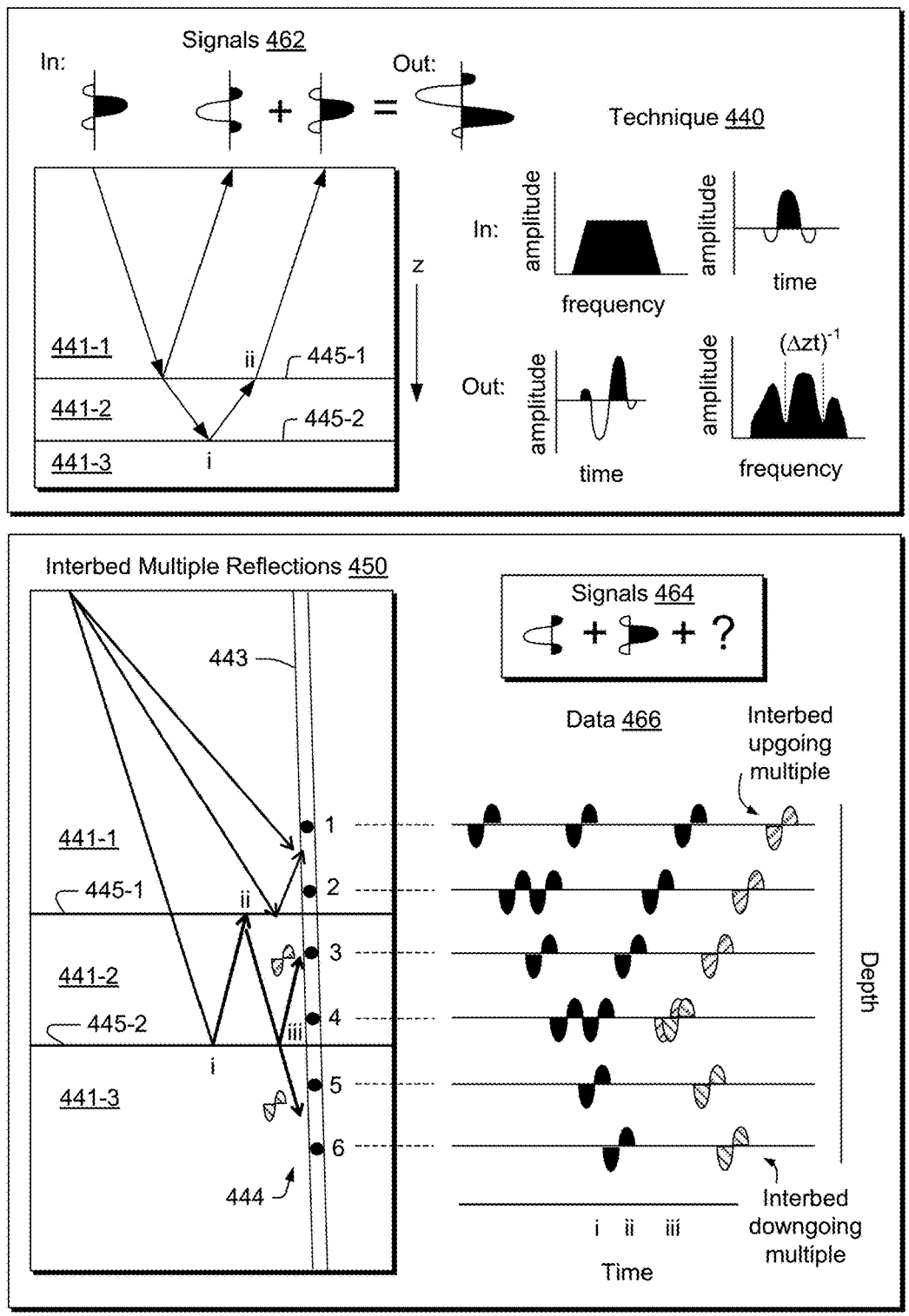
FIG. 4 illustrates examples of signals, an example of a technique, examples of data, etc.

FIG. 4 shows an example of a technique 440, examples of signals 462 associated with the technique 440, examples of interbed multiple reflections 450 and examples of signals 464 and data 466 associated with the interbed multiple reflections 450. As an example, the technique 440 may include emitting energy with respect to time where the energy may be represented in a frequency domain, for example, as a band of frequencies. In such an example, the emitted energy may be a wavelet and, for example, referred to as a source wavelet which has a corresponding frequency spectrum (e.g., per a Fourier transform of the wavelet).

As an example, a geologic environment may include layers 441-1, 441-2 and 441-3 where an interface 445-1 exists between the layers 441-1 and 441-2 and where an interface 445-2 exists between the layers 441-2 and 441-3. As illustrated in FIG. 4, a wavelet may be first transmitted downward in the layer 441-1; be, in part, reflected upward by the interface 445-1 and transmitted upward in the layer 441-1; be, in part, transmitted through the interface 445-1 and transmitted downward in the layer 441-2; be, in part, reflected upward by the interface 445-2 (see, e.g., "i") and transmitted upward in the layer 441-2; and be, in part, transmitted through the interface 445-1 (see, e.g., "ii") and again transmitted in the layer 441-1. In such an example, signals (see, e.g., the signals 462) may be received as a result of wavelet reflection from the interface 445-1 and as a result of wavelet reflection from the interface 445-2. These signals may be shifted in time and in polarity such that addition of these signals results in a waveform that may be analyzed to derive some information as to one or more characteristics of the layer 441-2 (e.g., and/or one or more of the interfaces 445-1 and 445-2). For example, a Fourier transform of signals may provide information in a frequency domain that can be used to estimate a temporal thickness (e.g., Δzt) of the layer 441-2 (e.g., as related to acoustic impedance, reflectivity, etc.).

As to the data 466, as an example, they illustrate further transmissions of emitted energy, including transmissions associated with the interbed multiple reflections 450. For example, while the technique 440 is illustrated with respect to interface related events i and ii, the data 466 further account for additional interface related events, denoted iii, that stem from the event ii. Specifically, as shown in FIG. 4, energy is reflected downward by the interface 445-1 where a portion of that energy is transmitted through the interface 445-2 as an interbed downgoing multiple and where another portion of that energy is reflected upward by the interface 445-2 as an interbed upgoing multiple. These portions of energy may be received by one or more receivers 444 (e.g., disposed in a well 443) as signals. These signals may be summed with other signals, for example, as explained with respect to the technique 440. For example, such interbed multiple signals may be received by one or more receivers over a period of time in a manner that acts to "sum" their amplitudes with amplitudes of other signals (see, e.g., illustration of signals 462 where interbed multiple signals are represented by a question mark "?"). In such an example, the additional interbed signals may interfere with an analysis that aims to determine one or more characteristics of the layer 441-2 (e.g., and/or one or more of the interfaces 445-1 and 445-2). For example, interbed multiple signals may interfere with identification of a layer, an interface, interfaces, etc. (e.g., consider an analysis that determines temporal thickness of a layer, etc.).

Figure 5:
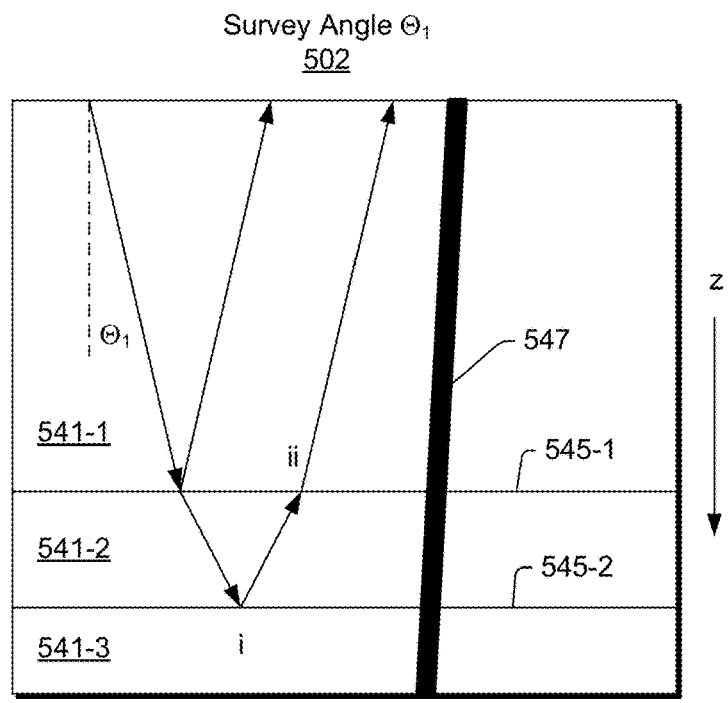
FIG. 5 illustrates examples of survey angles.
Figure 5:
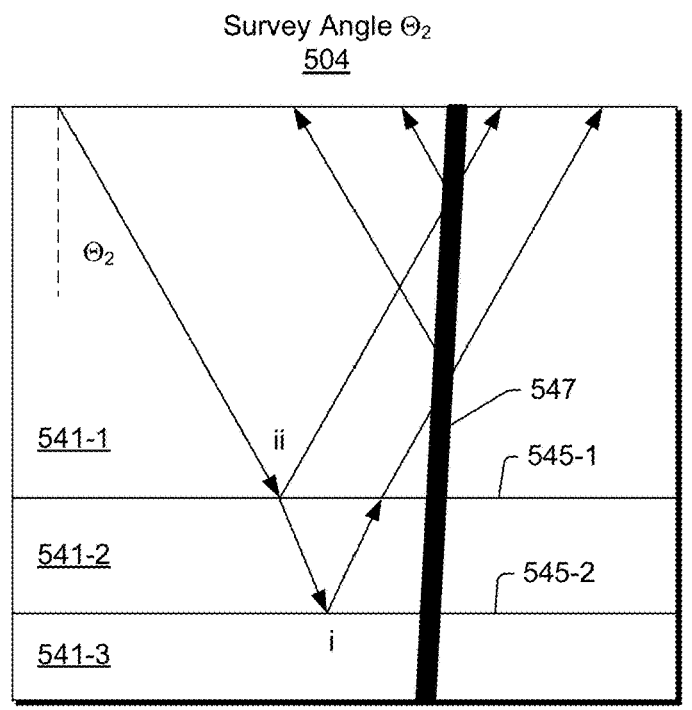

FIG. 5 shows examples 502 and 504 of survey angles $\Theta_1$ and $\Theta_2$ in a geologic environment that includes layers 541-1, 541-2 and 541-3 where an interface 545-1 exists between the layers 541-1 and 541-2, where an interface 545-2 exists between the layers 541-2 and 541-3 and where a relatively vertical feature 547 extends through the layers 541-1, 541-2 and 541-3.

As shown in the examples 502 and 504, the angle $\Theta_1$ is less than the angle $\Theta_2$. As angle increases, path length of a wave traveling in a subsurface region from an emitter to a detector increases, which can lead to attenuation of higher frequencies and increased interactions with features such as the feature 547. Thus, arrangements of emitters and detectors can, for a particular subsurface region, have an effect on acquired seismic survey data that covers that subsurface region.

Figure 6:
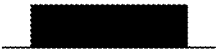
FIG. 6 illustrates examples of trends with respect to survey angles.
Figure 6:
Figure 6:
Figure 6:
Figure 6:
Figure 6:
Figure 6:
Figure 6:
Figure 6:
Figure 6:
Figure 6:
Figure 6:

FIG. 6 shows examples of trends 610 that may exist as angle increases. The trends 610 include a path length trend where path length increases with respect to angle, a frequency trend where higher frequencies are attenuated with respect to angle and where "resolution" with respect to layer thickness decreases with respect to angle (e.g., smaller angles may provide high resolution that can distinguish thinner layers).

Figure 7:
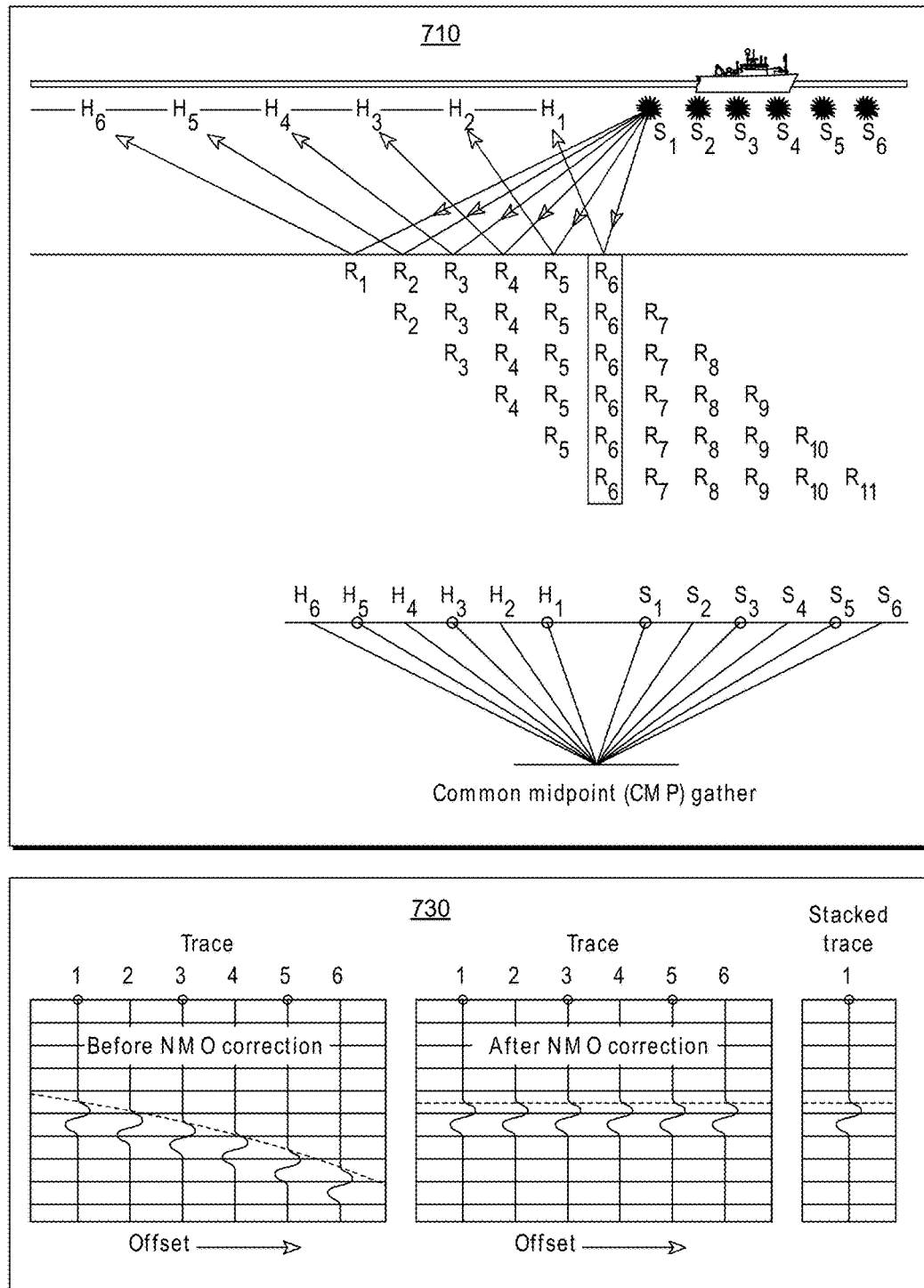
FIG. 7 illustrates an example of a survey and an example of a moveout technique.

FIG. 7 shows an example of a survey technique 710 and an example of processing seismic data 730, which may be referred to as normal moveout (NMO). NMO aims to account for the effect of the separation between receiver and source on the arrival time of a reflection that does not dip. A reflection may arrive first at the receiver nearest the source. The offset between the source and other receivers induces a delay in the arrival time of a reflection from a horizontal surface at depth. A plot of arrival times versus offset has a hyperbolic shape.

As shown in the example of FIG. 7, traces from different source-receiver pairs that share a common midpoint (CMP), such as receiver 6 (R6), can be adjusted during seismic processing to remove effects of different source-receiver offsets, or NMO. After NMO adjustments, the traces can be stacked to improve the signal-to-noise ratio.

Figure 8:
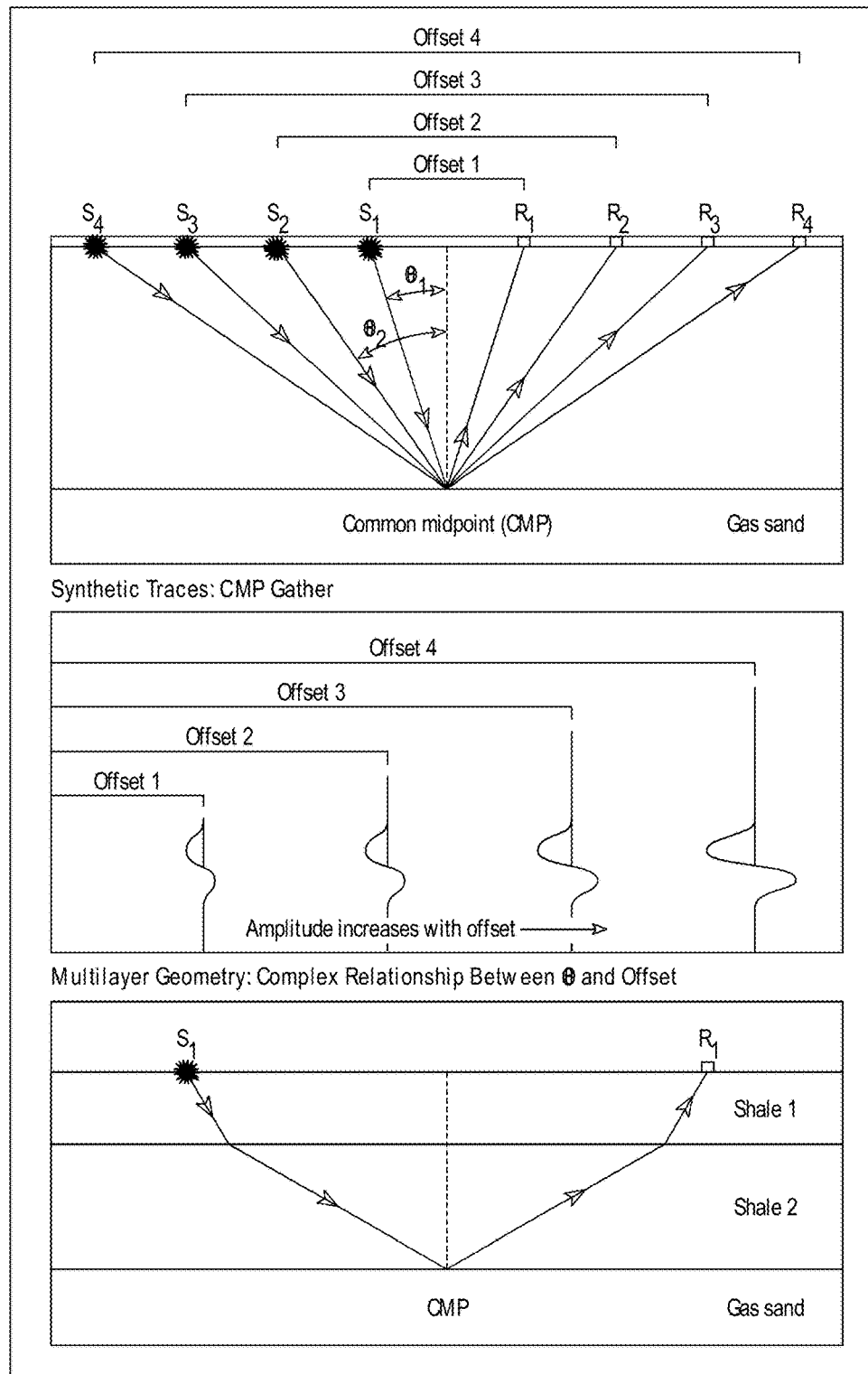
FIG. 8 illustrates an example of a survey and associated processing.

FIG. 8 shows an example of various AVO processes where angles exist between a common midpoint (CMP) and sources and receivers. As shown in FIG. 8, amplitude can increase with offset. In such an example, averaging the four traces with Offsets 1, 2, 3 and 4 would produce a trace that does not resemble a zero-offset trace; in other words, stacking would not preserve amplitudes. As shown in the lower view of FIG. 8, the offset versus angle relationship may be determined by, for example, ray tracing.

Figure 9:
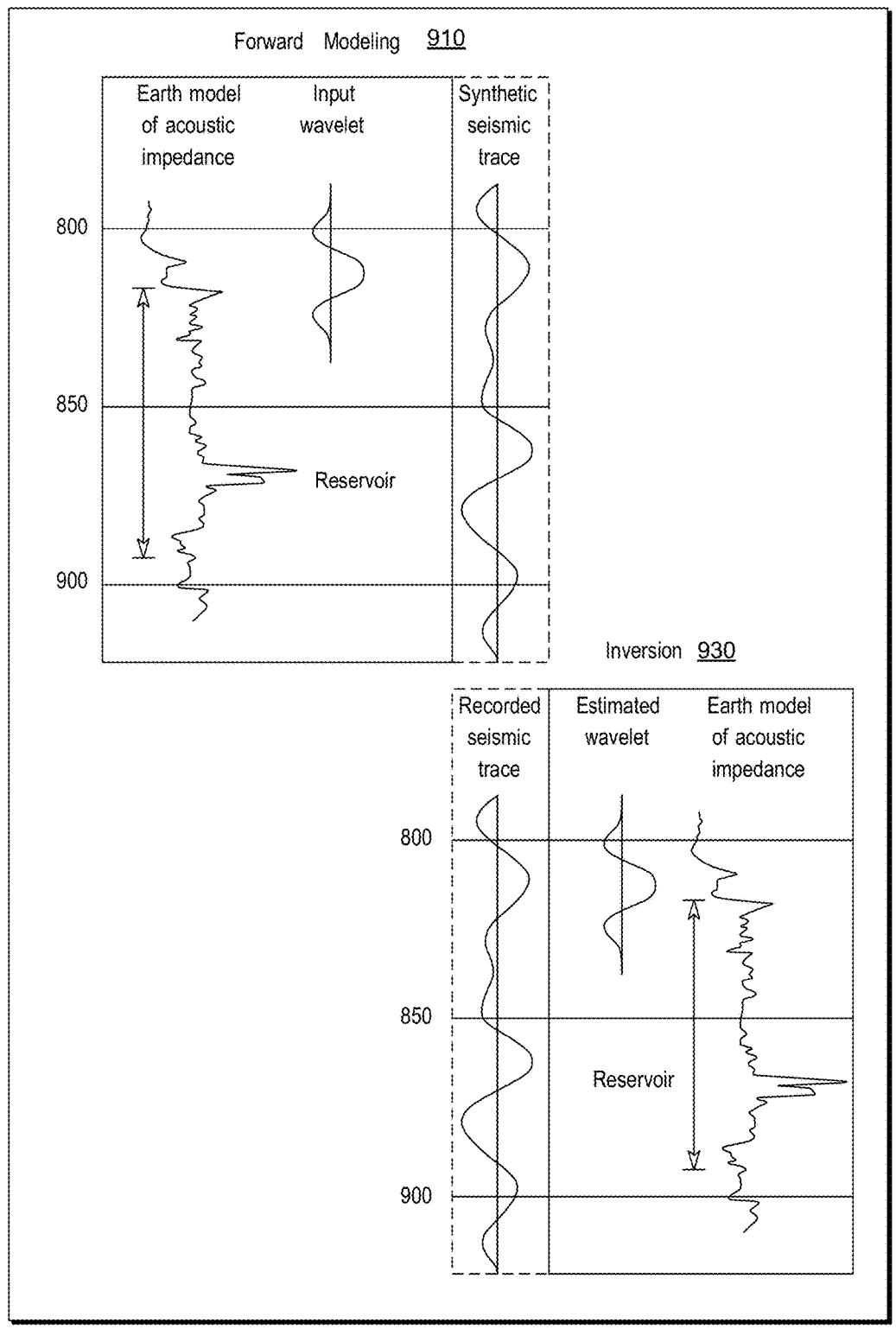
FIG. 9 illustrates an example of forward modeling and an example of inversion involving a synthetic seismic trace.

FIG. 9 shows an example of forward modeling 910 and an example of inversion 930 (e.g., an inversion or inverting). As shown, the forward modeling 910 progresses from an earth model of acoustic impedance and an input wavelet to a synthetic seismic trace while the inversion 930 progresses from a recorded seismic trace to an estimated wavelet and an Earth model of acoustic impedance. As an example, forward modeling can take a model of formation properties (e.g., acoustic impedance as may be available from well logs) and combine such information with a seismic wavelength (e.g., a pulse) to output one or more synthetic seismic traces while inversion can commence with a recorded seismic trace, account for effect(s) of an estimated wavelet (e.g., a pulse) to generate values of acoustic impedance for a series of points in time (e.g., depth).

As an example, a method may employ amplitude inversion. For example, an amplitude inversion method may receive arrival times and amplitude of reflected seismic waves at a plurality of reflection points to solve for relative impedances of a formation bounded by the imaged reflectors. Such an approach may be a form of seismic inversion for reservoir characterization, which may assist in generation of models of rock properties.

As an example, an inversion process can commence with forward modeling, for example, to provide a model of layers with estimated formation depths, thicknesses, densities and velocities, which may, for example, be based at least in part on information such as well log information. A model may account for compressional wave velocities and density, which may be used to invert for P-wave, or acoustic, impedance. As an example, a model can account for shear velocities and, for example, solve for S-wave, or elastic, impedance. As an example, a model may be combined with a seismic wavelet (e.g., a pulse) to generate a synthetic seismic trace.

Inversion can aim to generate a "best-fit" model by, for example, iterating between forward modeling and inversion while seeking to minimize differences between a synthetic trace or traces and actual seismic data.

As an example, a framework such as the ISIS inversion framework (Schlumberger Limited, Houston Tex.) may be implemented to perform an inversion. As an example, a framework such as the Linerarized Orthotropic Inversion framework (Schlumberger Limited, Houston, Tex.) may be implemented to perform an inversion.

As an example, a method may include common mid-point (CMP) stacking as a process that uses the fact that a particular location in the subsurface will have been sampled numerous times and at different offsets. In such an example, a group of traces may be constructed with a range of offsets that sample a particular subsurface location (e.g., a common mid-point gather (CMP gather)). As an example, an average amplitude may be calculated along a time sample, resulting in lower random noise; however, with a loss as to information about relationship between seismic amplitude and offset.

As an example, seismic data may be processed in a technique called "depth imaging" to form an image (e.g., a depth image) of reflection amplitudes in a depth domain for a particular target structure (e.g., a geologic subsurface region of interest).

As an example, seismic data may be processed to obtain an elastic model pertaining to elastic properties of a geologic subsurface region. For example, consider elastic properties such as density, compressional (P) impedance, compression velocity ($v_p$)-to-shear velocity ($v_s$) ratio, anisotropy, etc. As an example, an elastic model can provide various insights as to a surveyed region's lithology, reservoir quality, fluids, etc.

As explained with respect to FIG. 9, one way to determine an elastic model involves using seismic amplitude versus offset (AVO) inversion. With AVO inversion, a depth image is converted into a time domain so that the resulting time domain data may be convolved with a consistent wavelet that may vary spatially and temporally.

As an example, a method can include generating an elastic model without performing transformations between the time and depth domains. Such an approach may reduce demands as to time, computational resources, etc. As an example, consider a method that generates an elastic model based at least in part on a depth image and impulse responses of a combined modeling and migration of selected point scatterers in a region of interest. In such an example, the impulse response can be the response of the modeling and migration of a single point scatterer and may be a blurring operator, a Hessian operator or a point spread function (PSF). Such an approach of generating an elastic model can, for example, account for variations in reflection amplitudes that may arise due to such factors as complex geology, spatial variations in the acquisition geometry, processing system imperfections, etc.

While a method can include generating an elastic model in a depth domain without conversions between time and depth domains, domains other than the depth domain (the time domain, the phase domain, etc.) and thus, one or more transformations may be used to generate an elastic model.

As an example, an elastic model may be generated via an inversion process that is based on a comparison of a first depth image that is derived from actual seismic measurements with a synthetically-generated second depth image that is derived using the impulse responses and the first depth image. Again, in such an example, impulse responses may be represented via one or more of a blurring operator, a Hessian operator or a point spread function (PSF).

A point spread function (PSF) can describe a response of an imaging system to a point source or point object. As an example, a PSF can be an impulse response of a focused imaging system. A PSF may be considered to be an extended blob in an image that represents an unresolved object. Functionally, a PSF can be a spatial domain version of a transfer function of an imaging system. As an example, an acquired image of an object may be approximated as a convolution of the true object and a PSF (or PSFs).

Figure 10:
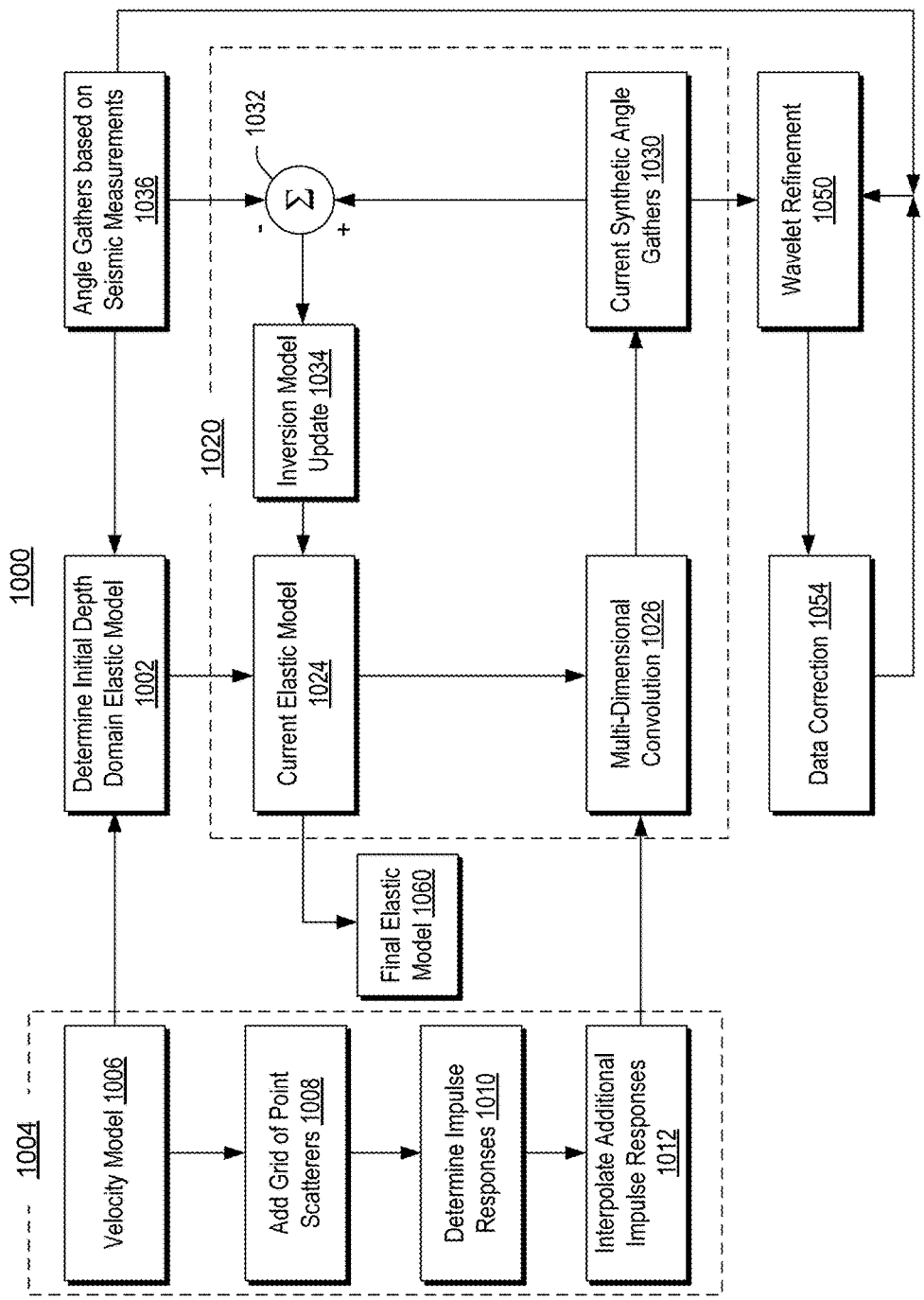
FIG. 10 illustrates an example of a system that includes an example of an elastic model in a depth domain.

FIG. 10 shows an example of a system 1000 that performs inversion in a depth domain and based at least in part on point scatterers. The system 1000 can utilize a point spread function (PSF) approach, which can account for one or more effects. While a PSF approach is illustrated, a blurring operator, a Hessian operator, etc., may be utilized additionally or alternatively.

In the example of FIG. 10, the system 1000 can be used to generate a final elastic model 1060 for a subsurface geologic region using actual seismic measurements acquired in a seismic survey of the region and well log data acquired in a logging operation in at least one well near or in the region. The system 1000 includes a subsystem 1004, which generates impulse responses. In this regard, the subsystem 1004 uses a velocity model 1006 and adds (block 1008) a grid of point scatterers for purposes of determining (block 1010) impulse responses at the point scatterers. It is noted that the velocity model 1006, in accordance with some implementations, can be the same (or similar or substantially the same) velocity model used for purposes of performing migration to derive a depth image and the determination of the impulse responses takes into account the kernel of the migration operation (the kernel of a reverse time migration (RTM) operation, for example), as well as the velocity model 1006.

As an example, a grid of point scatterers may include fewer than a total number of points of a depth image. As an example, the subsystem 1004 can interpolate (block 1012) the corresponding additional impulse responses. Regardless of whether interpolation is used or not, however, the impulse responses determined by the subsystem 1004 are provided to a system 1020, which performs one or more iterations for purposes of generating the final elastic model 1060.

In accordance with some example implementations, the subsystem 1020 can receive an initially-determined (see block 1002) depth domain elastic model. It is noted that this model may be estimated using, for example, angle gathers derived from the actual seismic measurements 1036 (e.g., migrated depth image gathers) and the velocity model 1006. On a first iteration, the subsystem 1020 can store the initial depth domain elastic model 1002 as a current elastic model 1024. The subsystem 1020 can perform individual iterations using, for example, a complex multi-dimensional convolution (block 1026) of the impulse responses with the current elastic model 1024 reflectivity to produce a synthetically-generated depth image (e.g., a set of current synthetic angle gathers 1030). The subsystem 1020, in turn, compares (e.g., via an adder 1032) the current synthetic angle gathers 1030 with the angle gathers 1036 to determine an inversion model update 1034. As an example, based on the inversion model update 1034, the subsystem 1020 may further modify the current elastic model 1024, deem that the current elastic model 1024 is now the final elastic model 1060, etc. As an example, where an additional iteration is performed by the system 1000, the subsystem 1020 can modify the current elastic model 1024 and proceeds to block 1026.

As an example, given availability of well log data, the system 1000 may refine the current synthetically-generated angle gathers 1030 and/or refine the angle gathers 1036, pursuant to block 1050. In this regard, using wavelet refinement, the system 1020 may determine one or more data corrections 1054 to be applied to the gathers 1030 and/or 1036.

Depending on the particular implementation, the system 1000 may be performed by software-based hardware and/or circuitry. As an example, the system 1000 may be implemented using one or more functional modules in an information processing apparatus, such as general purpose processors (central processing units (CPUs), or application specific integrated circuits (ASICs), field programmable gate arrays (FPGAs), programmable logic devices (PLDs), or other appropriate devices).

As illustrated in the example of FIG. 10, a pre-stack depth domain inversion approach can be utilized to recover elastic properties. As an example, such an approach may be adapted to receive as input user-defined subsurface/surface partitioned image gathers. As an example, such an approach can include an inversion scheme defined in a pre-stack depth domain where, for example, a cost function (e.g., parameterized in terms of elastic properties) can measure misfits between pre-stack synthetic images and pre-stack real images.

As an example, pre-stack synthetic images can be simulated through use of point spread functions (PSFs), for example, consider PSFs computed for a plurality of corresponding individual user-defined partitions. In such an example, these PSFs can help to capture, for example, dip-dependent pre-stack illumination effects (e.g., caused by an acquisition system and/or complexity of geology), which may degrade partitioned image gathers. As an example, a method can employ such a modeling and inversion approach to derive elastic properties that exhibit lesser bias due to one or more of these effects.

As an example, a method can include decomposing depth images into raw source-direction gathers. For example, consider angle domain common image gathers that may be used, for example, in techniques that involve migration velocity analysis and image quality enhancement through stacking. As an example, wavefield continuation migration techniques may be used to generate angle domain common image gathers where such techniques include decomposition of a wavefield into its plane wave components. As an example, a pre-imaging technique may be employed to generate an angle domain common image gather.

As an example, consider an angle domain common image gather being a function of an angle of incidence, or opening angle and an azimuth. For example, consider an incoming source wavefield (e.g., represented by a source vector) and a corresponding reflected receiver wavefield (e.g., represented by receiver vector) at a given image point. Such an example can be described in a Cartesian coordinate system that has reference x (inline), y (crossline) and z (depth) axes. In such an example, the source wavefield can reflect off of a reflector surface where the source vector, the receiver vector and a line that is tangential to the reflector surface are in a common plane; noting that reflector surface may deviate from an ideal horizontal plane. In such an example, the normal to the reflector plane makes an angle (e.g., dip) with the z-axis and the projection of the normal on the x-y plane makes another angle (e.g., reflector azimuth) with the x-axis.

Yet another angle is the opening angle that each of the source and the receiver wavefields make with respect to the normal axis. Another angle, a reflection azimuth can represent a bearing of a plane that includes the source vector, the receiver vector, and the normal axis. Given Snell's law of reflection, for determining the opening angle and the reflection azimuth at the image point, it is sufficient to estimate the direction of the source or receiver wavefield (e.g., rather than both). To estimate direction, one of several different techniques may be used, such as full plane wave decomposition at the image point, a matching pursuits approach, a technique using the Poynting vector or ray tracing, etc.

In the foregoing example, the direction of the source or receiver wavefield unambiguously determines the opening angle and the reflection azimuth for a given reflector geometry. If the dip and the azimuth are estimated at the image point, then it tends to be sufficient to determine just one of the source or the receiver wavefield directions. The opening angle implicitly means the phase opening angle, however, if a group angle is measured it can be transformed to phase angle and hence the methods and arguments hold for general anisotropic media.

In a two dimensional case, the opening angle may be different for the same source direction for different dips. For example, three different dips can, respectively, produce different opening angles, respectively, for the same source direction. Thus, if the dip and source direction are known, the opening angle may be determined. As an example, in a three-dimensional case, the opening angle and the reflection azimuth may be determined for a given source or receiver direction if dip and azimuth are known.

As an example, dip at an image point can vary according to source direction; and as a result, there may be multiple source directions and multiple corresponding dips present at the image point. Thus, results may be lacking where obtained via estimating a single dip for each image point.

As an example, a method can include determining opening angles for possible dips that are present at an image point, for example, to facilitate determining an angle domain common image gather.

As an example, a method can include processing data indicative of a first image of a subsurface region of interest to partition this first image based on directions of seismic waves used to acquire the first image to generate a second image. In such an example, the second image can be processed to determine a dip composition for each of the directions. Such an approach can include, based on the dip decompositions, and the directions, determining an angle domain common image gather.

As an example, a method can include partitioning a migration image as a function of source direction vectors that are measured at an image point during migration. In such an example, partitioning may be performed either in the time domain or in the frequency domain, for example, depending on the particular workflow involved. As an example, a method can include partitioning an image via binning where, for example, the method includes assigning partition weights (e.g., consider a zero or one scheme, etc.).

As an example, a source direction may be determined through a technique such as, for example, one or more of ray tracing from a shot to an image point, plane wave decomposition, the Poynting vector, calculating travel time derivatives, etc. As an example, a source direction may be determined using one or more other techniques.

As an example, an inversion technique may be applied with user-defined surface partitioned image gathers, such as vector image partition gathers. In such an example, a condition may be imposed such that the domain of decomposition can be accurately related to the associated incident angles, for example, to parameterize an inverse problem in terms of elastic properties.

Depth imaging of seismic data can help to construct a view of a reservoir structure, particularly where areas of complex geology exist and where areas with salt tectonics exist in a geologic environment.

Where a reservoir structure has been identified, a workflow may proceed to extracting further information such as, for example, information regarding one or more of lithology, reservoir quality, fluid properties, etc.

As mentioned, one approach to generating values for properties is to implement a technique that includes seismic amplitude variation with offset or angle (AVO or AVA) inversion.

As an example, for velocity and/or petrophysical analysis, a method may aim to determine variations between images at a fixed image point. In such an example, the images may be partial images of a survey where seismic data of the survey may be a multidimensional "image", which may be referred to as a whole image. In such an example, subsets of the whole image with fixed surface location may be rendered to a display, for example, to perform an analysis. As an example, sub-sets of the whole image may be referred to as common image gathers (CIG) or, for example, common reflection points (CRP) gathers.

As explained, amplitude inversion can assume that an input migrated image or angle-domain subsurface common image gather (CIG) has preserved relative amplitude information ("true amplitude") and is free from the effect of non-uniform illumination. Under such an assumption, depth-imaged data can be inverted by converting them back to the time domain to enable the seismic data to be represented by a 1-D convolutional model, for example, with a consistent wavelet that varies slowly with both time and spatial location (see, e.g., FIG. 9). Such an approach tends to be suitable in regions where an overburden stratigraphic structure tends to be relatively flat. However, in areas with dips and/or strong lateral variations, the 1-D convolution model approach can experience some quality issues.

As to quality issues, consider, as an example, illumination effects due to incomplete coverage and/or complex geological settings (e.g., shadow zones in subsalt imaging). Such scenarios can pose challenges to imaging algorithms such as, for example, the reverse-time migration (RTM) algorithm. Compensating for illumination effects in migrated images tends to pose challenges, particularly as to regularizing areas of quite poor illumination (e.g., consider challenges posed for CIGs).

As explained with respect to the system 1000 of FIG. 10, an approach can invert seismic migrated data directly in the depth domain. Such an approach can account for illumination effects in seismic migrated data, for example, by replacing a 1-D wavelet as may be used in the approach of FIG. 9 with, for example, the point spread function (PSF) of the depth imaging processing.

As an example, a method can include determining at least one impulse response of a modeling and migration of at least one point scatterer for a subsurface geologic region of interest; and, based at least in part on the at least one impulse response and a reflection amplitude image of the region, determining an elastic model for the region. In such an example, determining the elastic model can include inverting the reflection amplitude image in a depth domain, for example, where inverting the reflection amplitude image includes directly inverting the image in the depth domain without first transforming the image into another domain other than the depth domain. As an example, a reflection amplitude image can be an image formed from pre-stack seismic data.

As an example, a method can include determining at least one impulse response of a modeling and migration of at least one point scatterer for a subsurface geologic region of interest; and, based at least in part on the at least one impulse response and a reflection amplitude image of the region, determining an elastic model for the region where determining the elastic model includes simultaneously inverting a plurality of images derived from pre-stack data for the elastic model. In such an example, the plurality of images can include images derived from pre-stack data selected according to at least one of opening angles, offsets and reflection azimuths.

As an example, a method can include depth domain amplitude inverting of image gathers where the method includes working with images partitioned by at least one of opening angles, offsets and reflection azimuths.

As an example, a method can include inverting of one or more types of user-defined subsurface/surface partitioned image gathers. In such an example, the method can include simulating one or more types of amplitude effects, for example, through dip-dependent PSFs and/or, for example, defining a depth domain inversion problem in a corresponding user-defined partitioned domain. For example, consider a method that defines a depth domain inversion problem in a source-direction domain.

Various approaches to migration/inversion can regard data, d, as the result of a linear modelling operator, M, applied to the reflectivity model, r. d=Mr.

The least-squares inverse to such a problem can be stated as, for example:

$$\hat{r} = (M^*M)^{-1}M^*d, \tag{1}$$

where $M^*$, the adjoint of modelling, is the migration operator. In such an approach, the true reflectivity model and the migrated image, $I=M^*d$, can be related through, for example:

$$I = M^*Mr = Hr, \tag{2}$$

where the Hessian operator, $H=M^*M$, can be considered to be modelling followed by migration; it may be a measure of illumination that reflects the effects of velocity variation and the acquisition footprint.

As an example, a method can include relaxing a relationship rule such as a rule that states that the modeling operator and the migration operator are related to each other. In such an example, the operator H can still be considered to be as an operator that blurs the true reflectivity model to give the image (e.g., a type of blurring operator).

As an example, a method can include an approach where the operator H defines the multidimensional impulse response of a modeling (e.g., demigration) and migration process at a point scatterer, which may can be referred to as a PSF. As an example, the operator H can be approximated by a set of discrete multi-dimensional impulse response filter PSFs.

As an example, a method can include defining a multi-dimensional earth model (e.g., 3D earth model) m as elastic properties (e.g., acoustic impedance, Vp/Vs ratio, and density) and can represent the (e.g., possibly non-linear) plane wave angle dependent reflectivity calculation as, for example:

$$r_{\theta(\chi)} = R(m, \theta(\chi)), \tag{3}$$

where $\chi$ is a user-defined image partitioning parameter, and $\theta(\chi)$ is the incident angle. As an example, Equation (2) can be approximated as:

$$I = \int I_\chi d\chi = \int H_\chi r_{\theta(\chi)} d\chi = \int H_\chi R(m, \theta(\chi)) d\chi, \tag{4}$$

where $I_\chi$ is the image partitioned with respect to the user-defined parameter, and $H_\chi$ is defined by the PSFs at the same partition.

To invert for the elastic properties, a simulated image for individual user-defined partitions, for example, consider individual partition $H_\chi R(m, \theta(\chi))$, can be compared with the original image, $I_\chi$, at the corresponding partition, and the model can be updated to derive the model that minimizes the image misfit.

As an example, a method can include defining a depth domain inversion problem for one or more particular types of subsurface image gathers. For example, a graphical user interface (GUI) may allow a computing device to receive input that can specify a particular type of subsurface image gather. In such an example, partitioning may occur based at least in part on a selected type.

As an example, one or more techniques may be used to compute subsurface CIGs for reverse-time migration (RTM), wavefield continuation migration, and ray-based methods. As an example, direction-vector based techniques can offer cost effectiveness when compared to some other techniques. Various techniques include estimating a vector associated with a source wavefield and a receiver wavefield where the estimated vector represents a dominant direction of propagation.

As an example, a vector-based approach may be utilized where such an approach includes estimating at least one vector associated with a source wavefield and/or a receiver wavefield. As an example, a vector-based approach may be utilized where a single vector is estimated and, for example, where that single vector corresponds to a source wavefield (e.g., a source wavefield vector).

As an example, where a vector-based approach is utilized, computation of the incident angle and azimuth can follow.

As an example, a method can include computing PSFs that may correspond to one or more dips. As an example, a method can include computing PSFs where the PSFs correspond to less than a full range of dips (e.g., angles).

As an example, a method can include computing incident angle and azimuth via a direction vector estimate for a source wavefield. For example, as mentioned, if dip and the azimuth are estimated at an image point, then it tends to be sufficient to determine just one of the source or the receiver wavefield directions.

As an example, a method can include decomposing an image as a function of a source-direction vector measured at an image point during migration. Such an approach can results in a so-called "raw source-direction common image gather" (SDG). Such a method can then include post-processing after imaging to convert SDGs from the source-direction to the incident-angle domain.

As an example, a method can include computing the incident angle and azimuth, for example, based at least in part on a source-direction vector and dip and azimuth of a reflector at an image point. As mentioned, dip and azimuth can be estimated from such partial source-direction images. In a scenario where multiple dips are present at an image point or, for example, dip estimation may be deemed to be relatively unstable in areas (e.g., with poor signal-to-noise ratios, etc.), a wide-range dip transformation approach in the wavenumber domain may be implemented. Such a wide-range dip transformation approach may be implemented where a method aims to transform source-direction PSF gathers to incident-angle PSF gathers.

As an example, rather that following an AVA inversion using incident-angle gathers, a method can include applying a pre-stack depth domain inversion scheme directly in the source-direction domain with the incident angle for reflectivity computation calculated through Equation (3). In such an example, the incident angle can be calculated from the source-direction vector and the dip and the azimuth of the reflector at the image point, for example, according to the follow relationship:

$$\cos(\theta(\vec{p}_s)) = \vec{p}_s \cdot \vec{n}, \qquad (5)$$

where $\chi = \vec{p}_s = (p_{sx}, p_{sy}, p_{sz})$ is the unit norm vector of source direction, and $\vec{n} = (n_x, n_y, n_z)$ is the unit norm vector of the reflector.

Figure 11:
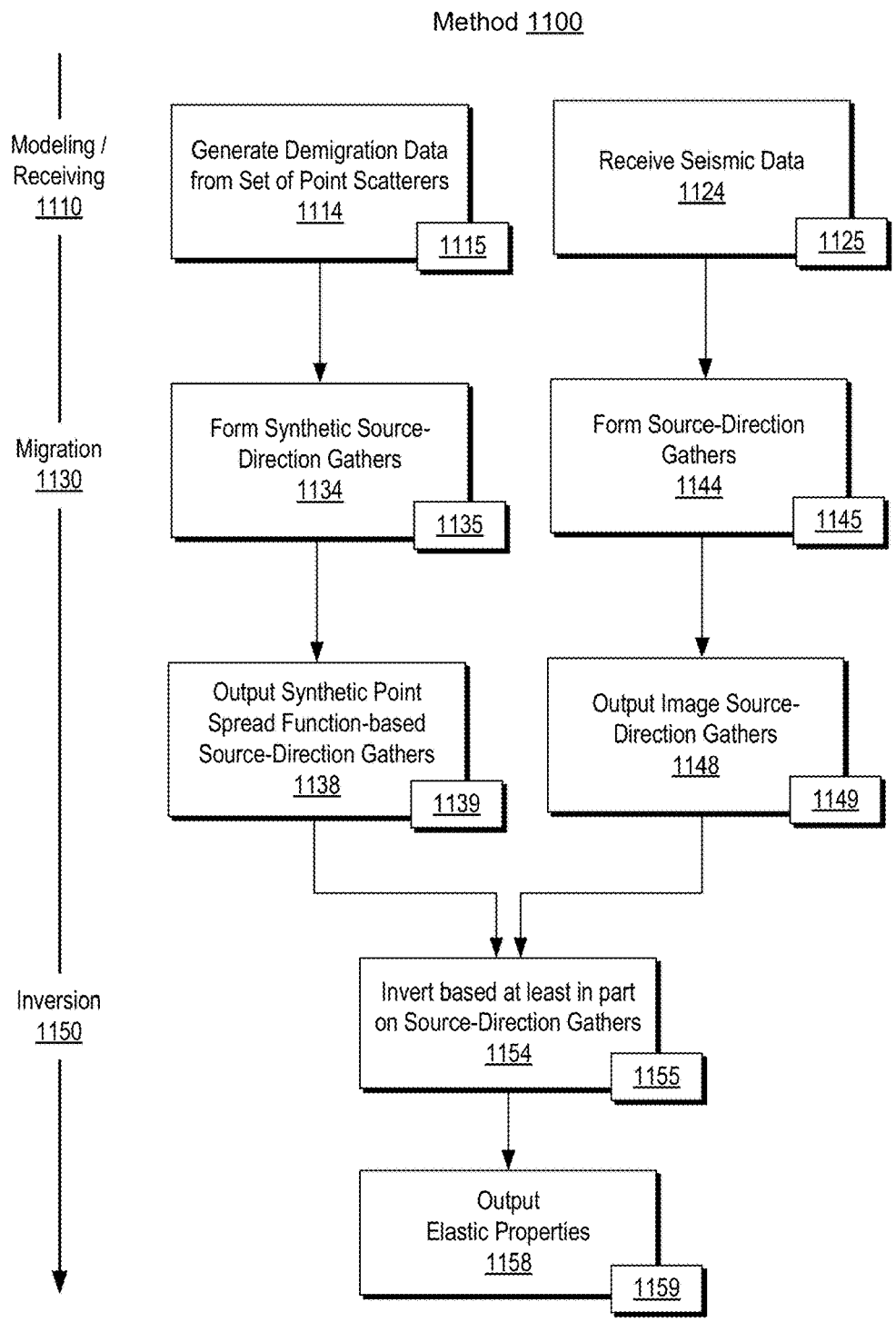
FIG. 11 illustrates an example of a method.

FIG. 11 shows an example of a method 1100 where, for example, source-direction CIGs may be utilized. As shown in the example of FIG. 11, the method 1100 includes a portion 1110 for modeling and receiving, a portion 1130 for migrating (e.g., migration) and a portion 1150 for inverting (e.g., inversion).

As to the portion 1110, the method 1100 can include a generation block 1114 for generating demigration data from a set of point scatterers and a reception block 1124 for receiving seismic data (e.g., seismic data for depth imaging).

As to the portion 1130, the method 1100 can include a formation block 1134 for forming synthetic source-direction gathers (SDGs), an output block 1138 for outputting synthetic point spread function-based (PSF-based) SDGs, a formation block 1144 for forming SDGs from at least a portion of the received seismic data of the block 1124 and an output block 1148 for outputting image SDGs. As an example, the portion 1130 can include generating PSFs and image SDGs with the same imaging algorithm.

As to the portion 1150, the method 1100 can include an inversion block 1154 for inverting based at least in part on the PSF-based SDGs and the image SDGs and an output block 1158 for outputting elastic properties (e.g., one or more values for corresponding elastic properties). As an example, the portion 1150 can include running an inversion with PSF-based SDGs and image SDGs to get elastic properties.

Figure 12:
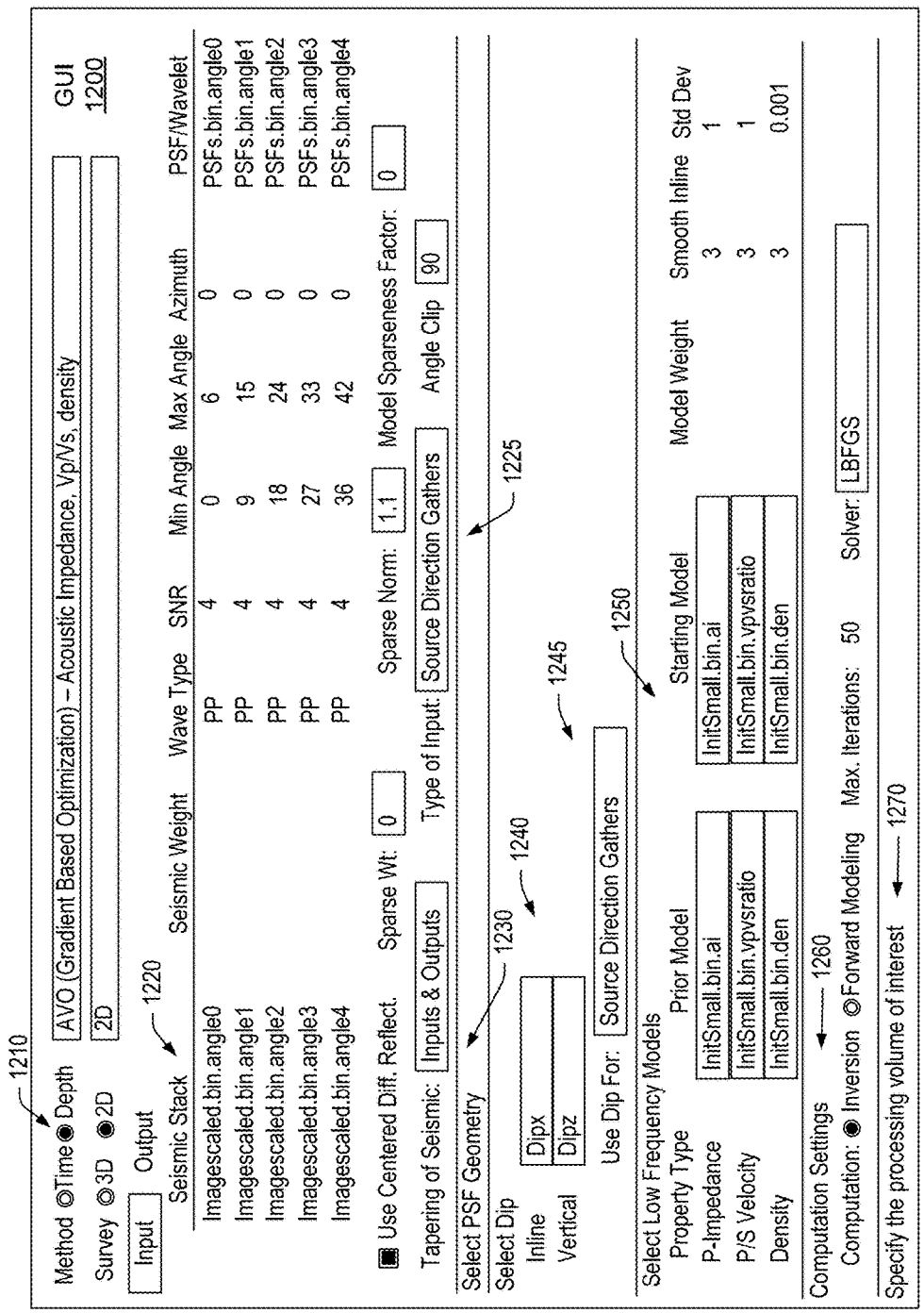
FIG. 12 illustrates an example of a graphical user interface.

FIG. 12 shows an example of a graphical user interface (GUI) 1200 that includes various fields that may be selected, for example, to input information, choices, commands, etc., to a computer. In the example of FIG. 12, the GUI 1200 can include a method selection control 1210, for example, to select time or depth (e.g., as well as spatial dimension as 2D or 3D); a series of seismic stack controls for input 1220, which can include a type of input control 1225, illustrated as being selected to be "source direction gathers"; a PSF geometry selection control 1230; a dip selection control section 1240 that can include a control for selecting how to use dip information such as, for example, using dip information for source direction gathers (see also, e.g., the input control 1225); a model control section 1250; a computation settings section 1260; and a region of interest section 1270. In the example of FIG. 12, various other controls are also shown such as, for example, controls for angles and azimuths as well as PSF/wavelet files, etc. As to low frequency models, the example of FIG. 12 shows model control fields for P-impedance, velocity ratio and density where options can exist as to smoothing (e.g., inline smoothing, etc.). As shown, computation settings may be selected in the section 1260, which may allow for selection of inversion or forward modeling, etc. As an example, a number of iterations may be selected where a solver operates in an iterative manner.

As an example a solver may be an inversion solver that implements an inversion technique. As an example, consider one or more of Gauss-Newton, limited memory Broyden-Fletcher-Goldfarb-Shanno (LBFGS), non-linear conjugate gradient, etc. As an example, a BFGS algorithm may be implemented as an iterative solver for a nonlinear optimization problem. In such an example, the BFGS algorithm can approximate Newton's method, for example, via a class of hill-climbing optimization techniques that seek a stationary point of a function (e.g., twice continuously differentiable, etc.).

As an example, the GUI 1200 may be implemented via instructions stored in memory where the instructions are executable by at least one processor to direct circuitry to render the GUI 1200 to a display (e.g., a touchscreen display, a non-touchscreen display, a projected display, etc.). As an example, such instructions may be a PETREL™ plug-in, add-on, integral module, etc.

In the GUI 1200 of FIG. 12, the scenario as to selected fields and information pertains to pre-stack depth domain inversion with source-direction CIGs in the PETREL™ seismic to simulation framework.

As an example, image and PSFs gathers can be supplied as source direction gathers (see, e.g., the control 1225) and dip fields can also be selected as input, for example, for opening angle calculation (see, e.g., the control 1245).

Figure 13:
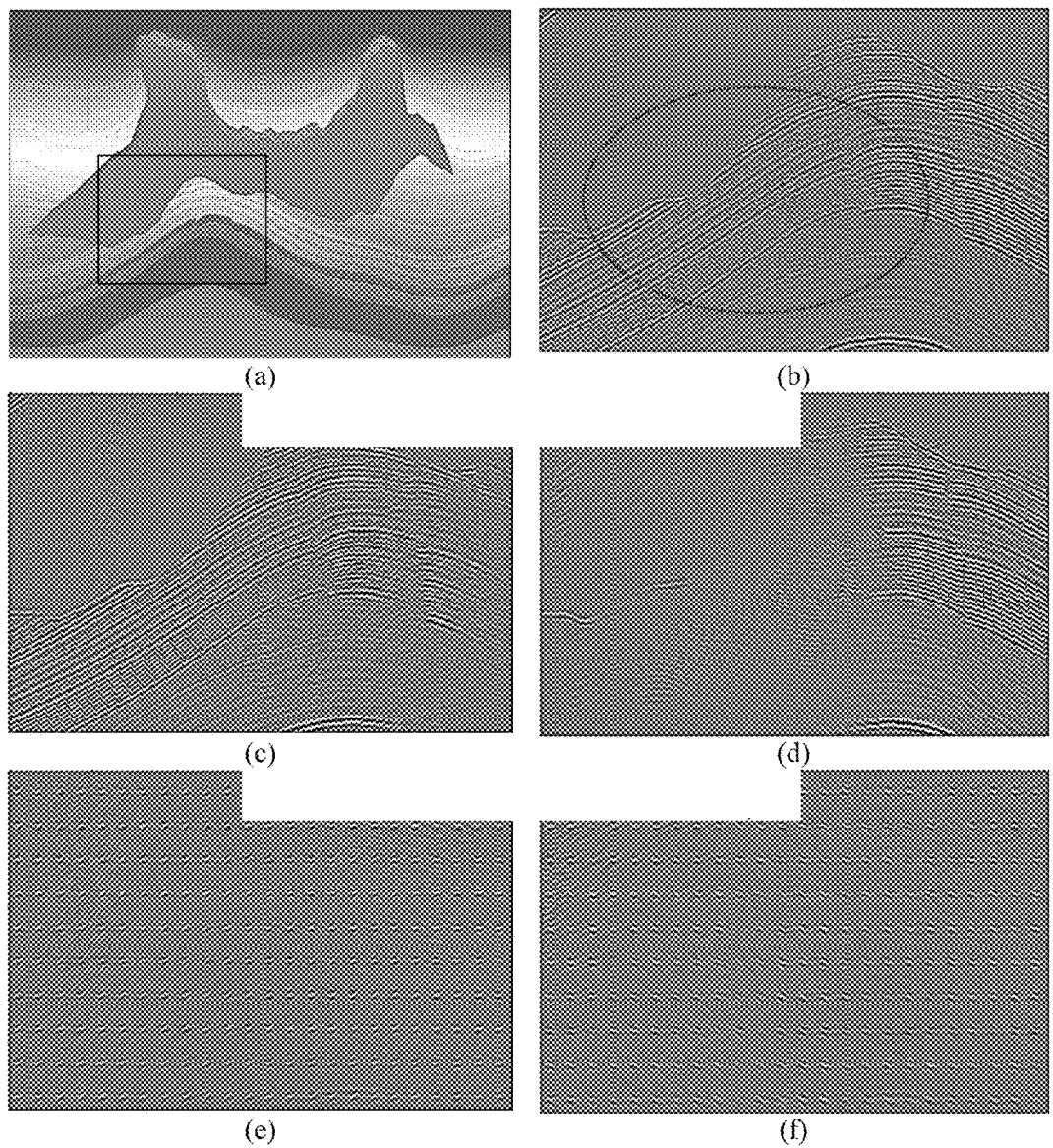
FIG. 13 illustrates examples of plots.
Figure 14:
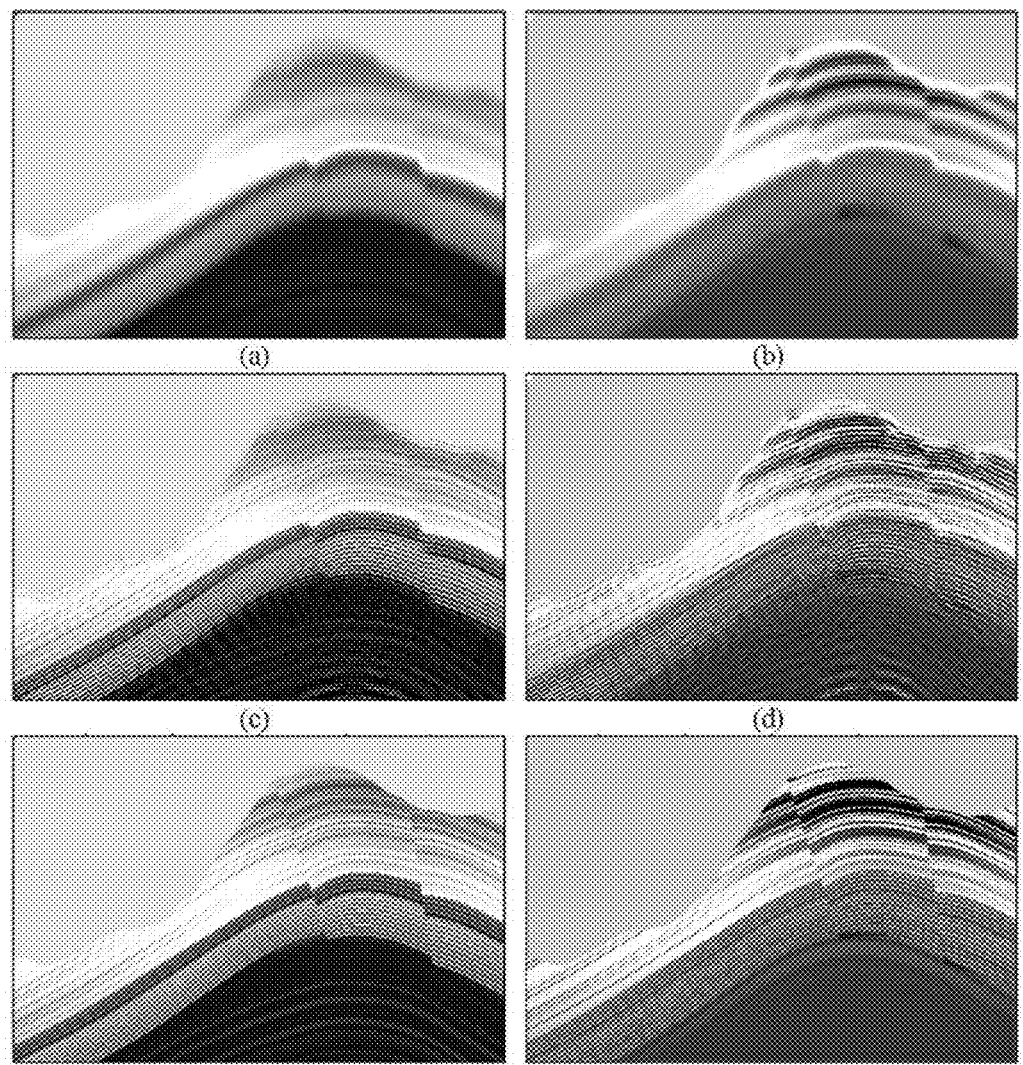
FIG. 14 illustrates examples of plots.

As an example, a method can include applying a pre-stack depth domain inversion scheme in the source-direction domain using the SEG Advanced Modeling Corporation (SEAM) complex 2D elastic model. FIGS. 13 and 14 show plots 1300 and 1400 that correspond to this example scheme. The plots 1300 and 1400 demonstrate the ability to remove, at least in part, various illumination effects and, for example, the ability to recover elastic properties.

In the example scenario, elastic data are modelled using the 2D elastic SEAM model and a symmetric split-spread survey. Data are generated by finite-difference modelling using a maximum frequency of about 50 Hz.

FIG. 13 shows a plot (a) of the P-wave velocity model. In the plot (a), a dashed rectangle highlights a subsalt area that may be considered to be relatively challenging to image due to illumination effects. As an example, image SDGs can be generated with a smoothed P-wave velocity model through acoustic reverse-time migration (RTM). As an example, PSF-based SDGs can be formed by acoustic demigration, for example, using a set of discrete point scatterers followed by acoustic reverse-time migration (RTM). As an example, generation of the image SDGs and the PSF SDGs may be performed using a common imaging workflow.

In the plots 1300, a plot (b) shows the stacked image at the target subsalt area after stacking the image SDGs. In the plot (b), it can be seen that the amplitudes are weaker and unbalanced in the area highlighted with the dashed ellipse due to the complex overburden structure.

In the plots 1300, plots (c) and (d) show the images at source directions 18 degrees and −18 degrees, respectively. In these plots, it can be observed that the image is relatively well illuminated when the source direction is orthogonal to the image structure.

In the plots 1300, plots (e) and (f) show corresponding PSF-based SDGs at source directions 18 degrees and −18 degrees, respectively. In these plots, the dominant dip of the PSF-based SDGs is relatively orthogonal to the source direction. Dashed arrows in the plots 1300, specifically (c), (d), (e) and (f), denote the source-direction vector.

FIG. 14 shows plots 1400 as including the target zone used for pre-stack depth domain inversion. Due to the complex salt structure, the illumination incident angle underneath the salt is in a range that is up to about 30 degrees, which may be insufficient to invert for density (e.g., as an elastic property).

In the plots 1400, plots (a) and (b) show the initial acoustic impedance and Vp/Vs, respectively, used in the inversion process, and plots (c) and (d) are the inverted acoustic impedance and Vp/Vs, respectively. These can be compared to the true acoustic impedance in a plot (e) and the true Vp/Vs in a plot (f). From such a comparison, two properties tend to be well recovered. In such an example, these recovered properties are relatively free of the illumination footprint present in the stacked image shown in the plot (b) of the plots 1300 (e.g., effects due to the complex salt overburden structure).

As an example, a method can include applying a pre-stack depth domain inversion approach to recover elastic properties in a manner that can be based at least in part on one or more user-defined subsurface/surface partitioned image gathers.

As an example, a method can include inverting seismic data directly in the depth domain, accounting for illumination effects in the image by replacing the 1D wavelet of time domain inversion with a point spread function (PSF) of a depth imaging process for one or more individual user-defined partitions.

As an example, a method can include processing source-direction domain image gathers. In such an example, pre-stack depth domain inversion can be driven by point spread function-based source-direction gathers (e.g., PSF-based SDGs), for example, with the incident angle associated with each gather calculated as part of a reflectivity computation. As an example, incident angle can be obtained from a source-direction vector and dip and azimuth of a reflector at an image point. As an example, such an inversion scheme may be applied using one or more other user-defined subsurface/surface partitioned image gathers, provided that the incident angle associated with each gather can be obtained for reflectivity computation.

As an example, a method can be applied to pre-stack depth domain inversion of a relatively poorly illuminated area (or areas) of a 2D SEAM model. As an example, an approach may select one area, perform processing and then select another area and perform processing to output values for one or more elastic properties.

While various examples are described with respect to output of elastic properties, particularly, recovering isotropic elastic properties, a method may be implemented for recovering anisotropic elastic properties.

The synthetic example presented in the plots 1300 and 1400 of FIGS. 13 and 14, included inversion of RTM image gathers using PSFs gathers generated from finite-difference wave-equation propagation. As an example, a method may include applying an inversion algorithm using PSF and image gathers generated using one or more other types of propagators. For example, consider a suitable propagator for one or more geologies that do may not necessarily warrant a full wave solution.

Figure 15:
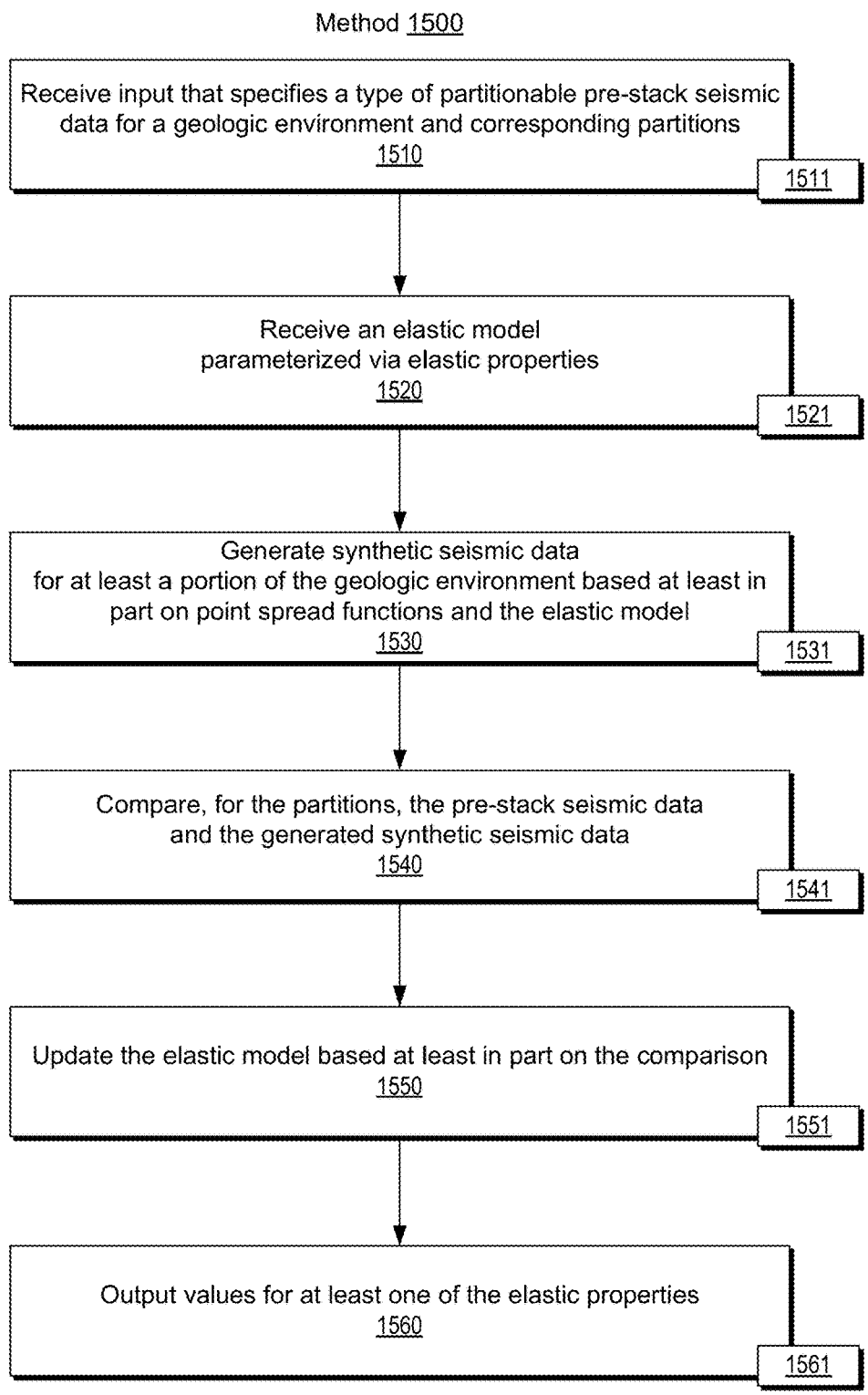
FIG. 15 illustrates an example of a method.

FIG. 15 shows an example of a method 1500 that includes a reception block 1510 for receiving input that specifies a type of partitionable pre-stack seismic data for a geologic environment and corresponding partitions; a reception block 1520 for receiving an elastic model parameterized via elastic properties; a generation block 1530 for generating synthetic seismic data for at least a portion of the geologic environment based at least in part on point spread functions and the elastic model; a comparison block 1540, for the partitions, comparing the pre-stack seismic data and the generated synthetic seismic data; an update block 1550 for, based at least in part on the comparing, updating the elastic model; and an output block 1560 for outputting values for at least one of the elastic properties.

Figure 16:
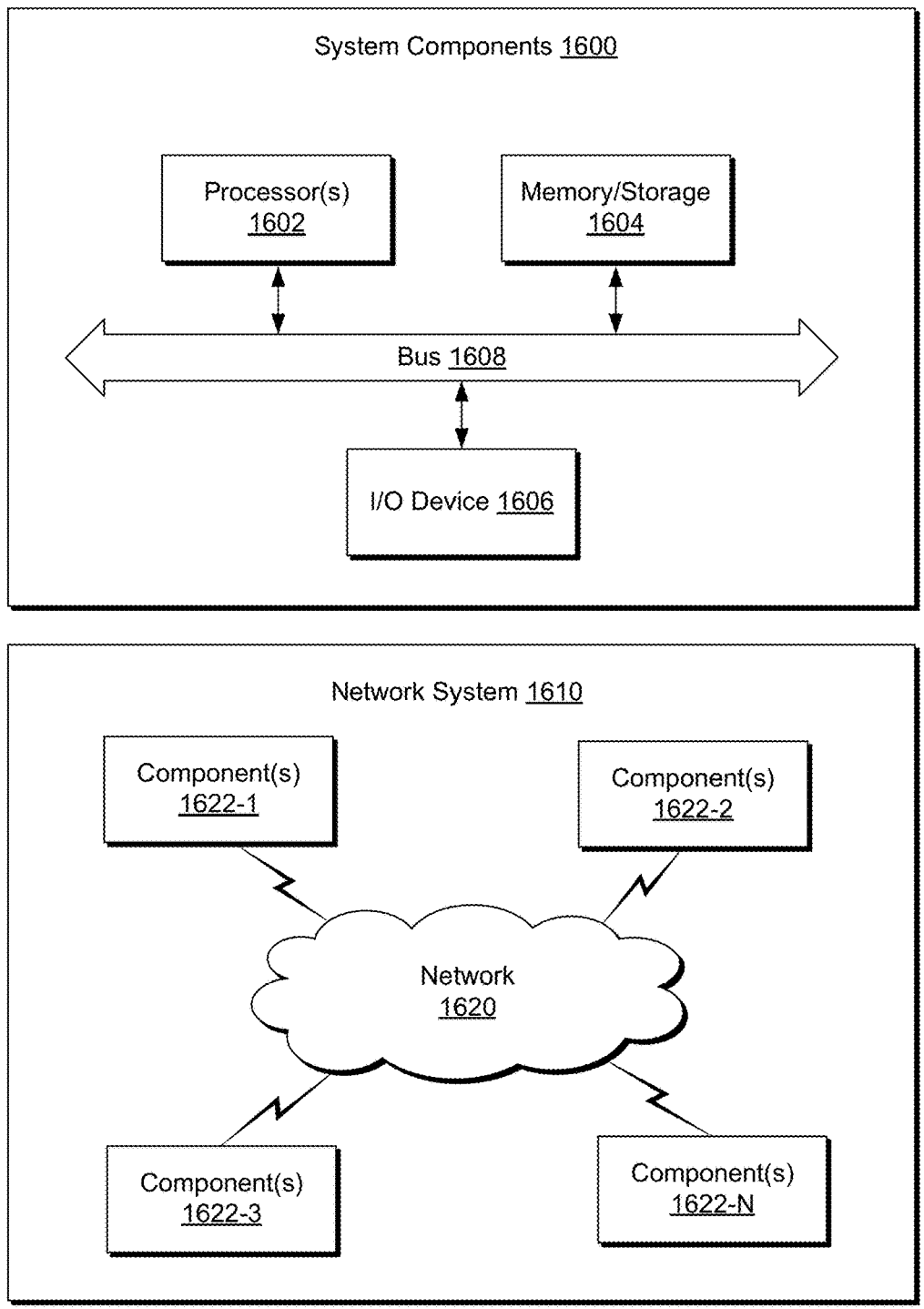
FIG. 16 illustrates example components of a system and a networked system.

As an example, a computer-readable medium (CRM) may be a computer-readable storage medium that is non-transitory and that is not a carrier wave. As an example, one or more blocks may be in the form of a module such as, for example, one of the modules 270 of the system 250 of FIG. 2. As shown in the example of FIG. 16, blocks 1511, 1521, 1531, 1541, 1551 and 1561, which may be CRM blocks, modules, etc., can be utilized to at least in part perform one or more actions of the method 1500. For example, the system 250 of FIG. 2 or another system (e.g., computing system, etc.) may be utilized to implement at least a portion of the method 1500.

As an example, a method can include receiving input that specifies a type of partitionable pre-stack seismic data for a geologic environment and corresponding partitions; receiving an elastic model parameterized via elastic properties; generating synthetic seismic data for at least a portion of the geologic environment based at least in part on point spread functions and the elastic model; for the partitions, comparing the pre-stack seismic data and the synthetic seismic data; based at least in part on the comparing, updating the elastic model; and outputting values for at least one of the elastic properties. In such an example, the comparing can include computing misfits between images based on the pre-stack seismic data and images based on the synthetic seismic data and, for example, the updating can include updating the elastic model based at least in part on the misfits.

As an example, a method can include partitioning pre-stack seismic data via at least one source-direction vector. As an example, a method can include partitioning pre-stack seismic data via binning. As an example, a method can include partitioning pre-stack seismic data via angle-based partitions.

As an example, a method can include dip dependent point source functions.

As an example, a method can include comparing via a cost function parameterized in terms of elastic properties and measuring misfits between images based on pre-stack seismic data and images based on synthetic seismic data. As an example, a method can be a computer-implemented method that includes receiving a cost function, which can be via accessing information stored in memory, accessing information via an interface (e.g., a network interface, etc.).

As an example, a method can include generating synthetic seismic data for at least a portion of a geologic environment based at least in part on point spread functions and an elastic model where such a method can include computing the point spread functions (PSFs), for example, where the PSFs can account for pre-stack illumination effects. As an example, illumination effects can depend on acquisition survey characteristics that acquired pre-stack seismic data. As an example, illumination effects can depend on dip of one or more physical structures in a geologic environment.

As an example, pre-stack seismic data can include gathers such as, for example, image gathers. As an example, synthetic seismic data can include synthetic gathers such as, for example, synthetic image gathers.

As an example, a method can include deriving values for at least one of elastic property in a depth domain. As an example, a method can include selecting a time domain approach or a depth domain approach, for example, via an instruction or command, which may be received by a computer via a graphical user interface (see, e.g., the GUI 1200 of FIG. 12).

As an example, a system can include a processor; memory operatively coupled to the processor; and processor-executable instructions stored in the memory to instruct the system where the instructions include instructions to receive input that specifies a type of partitionable pre-stack seismic data for a geologic environment and corresponding partitions, receive an elastic model parameterized via elastic properties, generate synthetic seismic data for at least a portion of the geologic environment based at least in part on point spread functions and the elastic model, for the partitions, compare the pre-stack seismic data and the synthetic seismic data, based at least in part on a comparison of the pre-stack seismic data and the synthetic seismic data, update the elastic model, and output values for at least one of the elastic properties. In such an example, the pre-stack seismic data can include gathers (e.g., image gathers). As an example, in the aforementioned system, instructions to generate can include instructions to compute the point spread functions where, for example, the point spread functions can account for pre-stack illumination effects.

As an example, one or more computer-readable storage media can include computer-executable instructions executable to instruct a computer to: receive input that specifies a type of partitionable pre-stack seismic data for a geologic environment and corresponding partitions; receive an elastic model parameterized via elastic properties; generate synthetic seismic data for at least a portion of the geologic environment based at least in part on point spread functions and the elastic model; for the partitions, compare the pre-stack seismic data and the synthetic seismic data; based at least in part on a comparison of the pre-stack seismic data and the synthetic seismic data, update the elastic model; and output values for at least one of the elastic properties. In such an example, the pre-stack seismic data can include gathers (e.g., image gathers). As an example, one or more computer-readable storage media can include instructions to generate synthetic seismic data for at least a portion of a geologic environment based at least in part on point spread functions and an elastic model where the instructions can include instructions to compute the point spread functions where, for example, the point spread functions can account for pre-stack illumination effects.

As an example, a gather can be seismic traces that share one or more acquisition parameters such as, for example, a common midpoint gather, which includes traces that include a substantially common midpoint. As an example, traces (e.g., seismic data) from different source-receiver pairs that share a common midpoint may be adjusted during seismic processing, for example, to reduce effects of different source-receiver offsets, or NMO. As an example, after NMO adjustments, traces may be stacked, which may act to improve signal-to-noise ratio.

As an example, a method can include processing information via a framework such as, for example, the OMEGA™ framework (Schlumberger Limited, Houston, Tex.). As an example, such a framework may provide for processing of geophysics data, for example, via one or more workflows, algorithms, etc. As an example, a framework may provide for accessing data from one or more sources and/or formats.

The aforementioned OMEGA™ framework may operatively couple with the PETREL™ framework and/or the OCEAN™ framework. For example, Earth Model Building (EMB) tools may enable a variety of depth imaging workflows, including model building, editing and updating, depth-tomography QC, residual moveout analysis, and volumetric common-image-point (CIP) pick QC. Such functionalities, in conjunction with the OMEGA™ framework algorithm (e.g., depth tomography, migration, etc.) may help to enhance imagery of a subsurface environment.

As an example, a framework may include one or more modules for processing data (e.g., imaging, prestack seismic interpretation, quantitative interpretation, exploration to development analysis, etc.).

As an example, a method may include seismic velocity modeling (SVM), which can include velocity model building. As an example, a workflow may include one or more of isotropic and anisotropic depth imaging, migration velocity model building and updating, 4D imaging and anisotropic illumination studies, and borehole to surface seismic calibration. As an example, a method may include geostatistical analysis.

As an example, in seismology, seismic data, vertical seismic profiles and/or well log data may be used to perform inversion that can generate a model as a result where the model can be model of layers, for example, including their thickness, density and P- and S-wave velocities.

As an example, a method can include surface wave analysis (SWA). For example, a method may include SWA modeling and inversion (SWAMI). As an example, a framework may be provided that can perform SWA associated calculations (e.g., SWAMI calculations, etc.). As an example, consider the SWAMI velocity modeling framework marketed by Schlumberger Limited (Houston, Tex.), which may optionally be utilized at least in part with one or more other frameworks (e.g., PETREL, OCEAN, OMEGA, etc.).

As an example, a workflow may be associated with various computer-readable media (CRM) blocks. Such blocks generally include instructions suitable for execution by one or more processors (or cores) to instruct a computing device or system to perform one or more actions. As an example, a single medium may be configured with instructions to allow for, at least in part, performance of various actions of a workflow. As an example, a computer-readable medium (CRM) may be a computer-readable storage medium. As an example, blocks may be provided as one or more modules, for example, such as the one or more modules 270 of the system 250 of FIG. 2.

FIG. 16 shows components of an example of a computing system 1600 and an example of a networked system 1610. The system 1600 includes one or more processors 1602, memory and/or storage components 1604, one or more input and/or output devices 1606 and a bus 1608. In an example embodiment, instructions may be stored in one or more computer-readable media (e.g., memory/storage components 1604). Such instructions may be read by one or more processors (e.g., the processor(s) 1602) via a communication bus (e.g., the bus 1608), which may be wired or wireless. The one or more processors may execute such instructions to implement (wholly or in part) one or more attributes (e.g., as part of a method). A user may view output from and interact with a process via an I/O device (e.g., the device 1606). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1610. The network system 1610 includes components 1622-1, 1622-2, 1622-3, . . . 1622-N. For example, the components 1622-1 may include the processor(s) 1602 while the component(s) 1622-3 may include memory accessible by the processor(s) 1602. Further, the component(s) 1602-2 may include an I/O device for display and optionally interaction with a method.

The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
receiving, via a computing system, input that specifies a type of partitionable pre-stack seismic data for a geologic environment and corresponding partitions;
receiving, via the computing system, pre-stack seismic data of the geologic environment wherein the pre-stack seismic data comprises source-direction image gathers;
generating, via the computing system, synthetic seismic data for at least a portion of the geologic environment based at least in part on point spread functions and a multi-dimensional elastic model parameterized via elastic properties, wherein the synthetic seismic data comprises synthetic source-direction image gathers;
performing an inversion, via the computing system, for at least one of the elastic properties wherein the performing comprises, for the partitions, comparing the pre-stack seismic data and the synthetic seismic data and, based at least in part on the comparing, updating the multi-dimensional elastic model; and
outputting, via the computing system, values for at least one of the elastic properties.

2. The method of claim 1 wherein the comparing comprises computing misfits between images based on the pre-stack seismic data and images based on the synthetic seismic data.

3. The method of claim 2 wherein the updating comprises updating the multi-dimensional elastic model based at least in part on the misfits.

4. The method of claim 1 comprising partitioning the pre-stack seismic data via at least one source-direction vector.

5. The method of claim 1 comprising partitioning the pre-stack seismic data via binning.

6. The method of claim 1 comprising partitioning the pre-stack seismic data via angle-based partitions.

7. The method of claim 1 wherein the point source functions comprise dip dependent point source functions.

8. The method of claim 1 wherein the comparing comprises receiving a cost function parameterized in terms of elastic properties and measuring misfits between images based on the pre-stack seismic data and images based on the synthetic seismic data.

9. The method of claim 1 wherein the generating comprises computing the point spread functions (PSFs) and wherein the PSFs account for pre-stack illumination effects.

10. The method of claim 9 wherein the illumination effects depend on acquisition survey characteristics that acquired the pre-stack seismic data.

11. The method of claim 9 wherein the illumination effects depend on dip of one or more physical structures in the geologic environment.

12. The method of claim 1 comprising deriving the values for at least one of the elastic properties in a depth domain.

13. A system comprising:
a processor;
memory operatively coupled to the processor; and
processor-executable instructions stored in the memory to instruct the system wherein the instructions comprise instructions to
receive input that specifies a type of partitionable pre-stack seismic data for a geologic environment and corresponding partitions,
receive pre-stack seismic data of the geologic environment wherein the pre-stack seismic data comprises source-direction image gathers,
generate synthetic seismic data for at least a portion of the geologic environment based at least in part on point spread functions and a multi-dimensional elastic model parameterized via elastic properties, wherein the synthetic seismic data comprises synthetic source-direction image gathers, perform an inversion for at least one of the elastic properties wherein the performance comprises, for the partitions, a comparison of the pre-stack seismic data and the synthetic seismic data and, based at least in part on the comparison, an update of the multi-dimensional elastic model, and output values for at least one of the elastic properties.

14. The system of claim 13 wherein the instructions to generate comprises instructions to compute the point spread functions and wherein the point spread functions account for pre-stack illumination effects.

15. One or more computer-readable storage media comprising computer-executable instructions executable to instruct a computer to:
receive input that specifies a type of partitionable pre-stack seismic data for a geologic environment and corresponding partitions;
receive pre-stack seismic data of the geologic environment wherein the pre-stack seismic data comprises source-direction image gathers,
generate synthetic seismic data for at least a portion of the geologic environment based at least in part on point spread functions and a multi-dimensional elastic model parameterized via elastic properties, wherein the synthetic seismic data comprises synthetic source-direction image gathers,
perform an inversion for at least one of the elastic properties wherein the performance comprises, for the partitions, a comparison of the pre-stack seismic data and the synthetic seismic data and, based at least in part on the comparison, an update of the multi-dimensional elastic model, and output values for at least one of the elastic properties.

16. The one or more computer-readable storage media of claim 15 wherein the instructions to generate comprises instructions to compute the point spread functions and wherein the point spread functions account for pre-stack illumination effects.

17. The method of claim 9 wherein the values for at least one of the elastic properties comprise values that exhibit lesser illumination effect bias.

18. The system of claim 14 wherein the values for at least one of the elastic properties comprise values that exhibit lesser illumination effect bias.

19. The one or more computer-readable storage media of claim 16 wherein the values for at least one of the elastic properties comprise values that exhibit lesser illumination effect bias.

* * * * *